(12) United States Patent
Girardi

(10) Patent No.: US 12,063,185 B2
(45) Date of Patent: *Aug. 13, 2024

(54) COMMUNICATION SYSTEM

(71) Applicant: WestCom Wireless, Inc, Lower Burrell, PA (US)

(72) Inventor: Frank Girardi, Lower Burrell, PA (US)

(73) Assignee: WESTCOM WIRELESS, INC, Lower Burrell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,735

(22) Filed: Jan. 5, 2024

(65) Prior Publication Data
US 2024/0146493 A1 May 2, 2024

Related U.S. Application Data

(63) Continuation-in-part of application No. 18/125,780, filed on Mar. 24, 2023, which is a continuation of application No. 17/227,586, filed on Apr. 12, 2021, now Pat. No. 11,646,858, which is a continuation-in-part of application No. 17/120,432, filed on Dec. 14, 2020, now Pat. No. 11,165,551.

(60) Provisional application No. 62/956,797, filed on Jan. 3, 2020.

(51) Int. Cl.
*H04L 5/14* (2006.01)
*H04B 1/401* (2015.01)
*H04B 1/713* (2011.01)
*H04B 1/3827* (2015.01)

(52) U.S. Cl.
CPC ............... *H04L 5/14* (2013.01); *H04B 1/401* (2013.01); *H04B 1/713* (2013.01); *H04B 2001/3866* (2013.01); *H04R 2430/01* (2013.01)

(58) Field of Classification Search
CPC .......... H04L 5/14; H04B 1/401; H04B 1/713; H04B 2001/3866; H04R 2430/01
USPC ......................................... 370/329, 330, 276
See application file for complete search history.

(56) References Cited

U.S. PATENT DOCUMENTS

| | | |
|---|---|---|
| 5,181,707 A | 1/1993 | Takei et al. |
| 6,181,707 B1 | 1/2001 | Erickson et al. |
| 7,082,314 B2 | 7/2006 | Farmer et al. |
| 7,187,712 B2 | 3/2007 | Chow et al. |
| 7,894,371 B2 | 2/2011 | Bonta et al. |
| 11,165,551 B2 * | 11/2021 | Girardi ................. H04W 76/11 |
| 11,165,551 B2 | 11/2021 | Girardi |

(Continued)

*Primary Examiner* — Chuong T Ho
(74) *Attorney, Agent, or Firm* — The Powers IP Law Firm

(57) ABSTRACT

A communication system includes a plurality of full duplex transceiver assemblies each having an ON condition and an OFF condition, and configured to be worn by a different user, each of the plurality of full duplex transceiver assemblies having a housing and printed circuit board coupled to the housing, the printed circuit board including a transceiver having a microprocessor. Each microprocessor is configured to emit a different stream of controlling data when the plurality of full duplex transceiver assemblies are in the ON condition, thereby allowing each of the plurality of full duplex transceiver assemblies to communicate among a plurality of different logical channels. Embedded with each different stream of controlling data is a unique identification number for grouping each of the plurality of full duplex transceiver assemblies together.

28 Claims, 10 Drawing Sheets

(56) References Cited

U.S. PATENT DOCUMENTS

| | | | | |
|---|---|---|---|---|
| 11,646,858 B2* | 5/2023 | Girardi | ................ | H04B 1/401 |
| | | | | 370/329 |
| 11,652,503 B2* | 5/2023 | Girardi | ................... | H04L 5/14 |
| | | | | 370/329 |
| 2002/0196813 A1 | 12/2002 | Chow et al. | | |
| 2009/0034432 A1 | 2/2009 | Bonta et al. | | |
| 2011/0038641 A1 | 2/2011 | Tanaka et al. | | |
| 2012/0127973 A1 | 5/2012 | Lin et al. | | |
| 2014/0179327 A1 | 6/2014 | Uwamori et al. | | |
| 2020/0280829 A1 | 9/2020 | Benefield | | |
| 2020/0296781 A1 | 9/2020 | Fraser | | |
| 2020/0336277 A1 | 10/2020 | Gossiaux et al. | | |
| 2020/0351072 A1 | 11/2020 | Khandani | | |
| 2021/0099275 A1* | 4/2021 | Girardi | ................... | H04L 5/14 |
| 2021/0104821 A1 | 4/2021 | Gurbuz et al. | | |
| 2021/0258035 A1* | 8/2021 | Girardi | ................... | H04R 3/00 |

* cited by examiner

COMMUNICATION SYSTEM

CROSS REFERENCE TO RELATED APPLICATIONS

This application is a continuation-in-part patent application claiming priority to U.S. patent application Ser. No. 18/125,780, filed Mar. 24, 2023, and entitled "COMMUNICATION SYSTEM", which claims priority to and claims the benefit of U.S. patent application Ser. No. 17/227,586, filed Apr. 12, 2021, and entitled "COMMUNICATION SYSTEM, FULL DUPLEX TRANSCEIVER ASSEMBLY THEREFOR, AND ASSOCIATED METHOD," now U.S. Pat. No. 11,646,858, which claims priority to and claims the benefit of U.S. patent application Ser. No. 17/120,432, filed Dec. 14, 2020, and entitled "COMMUNICATION SYSTEM, FULL DUPLEX TRANSCEIVER ASSEMBLY AND FULL DUPLEX TRANSCEIVER AMPLIFIER ASSEMBLY THEREFOR, AND ASSOCIATED METHOD," now U.S. Pat. No. 11,165,551, which claims priority to and claims the benefit of U.S. Provisional Patent Application Ser. No. 62/956,797, filed Jan. 3, 2020, the contents of which are incorporated herein by reference.

BACKGROUND OF THE DISCLOSURE

Field of the Disclosure

The present disclosure is related to a communication system. The present disclosure is also related to full duplex transceiver assemblies and full duplex transceiver amplifier assemblies for communication systems. The present disclosure is also related to methods of providing a communication system.

Description of Related Art

Known communication systems that use frequency hopping employ assigned channel hopping in order to provide each device within the system the ability to switch off of a busy channel and onto another channel. For example, different systems may employ algorithms in order to allow a given device to directly jump from one frequency to another. These communication systems had been successful prior to an influx of other devices in the Industrial, Scientific and Medical Radio Band (ISM) frequencies. While the instant disclosed concept is not limited to any particular communication setting, comparisons may be made to systems in the amateur and professional sports contexts, wherein devices typically operate in congested frequencies. In these contexts, the influx of devices (e.g., cordless phones, sideline replay systems, wireless scoreboards, WiFi, and wireless intercoms) near (e.g., or in in the same stadium during a contest) coaches and other personnel using communication equipment has complicated their ability to move between frequencies.

Furthermore, using assigned channel hopping has become significantly harder to provide clear and interference free communications when a large number of devices are paired together (e.g., when multiple coaches on a single team are paired together), or when multiple groups are within the same area of operation. For example, because of the interference that occurs when multiple devices are hopping between frequencies, it is common in known systems for different groups to be restricted to different frequencies. During a football game, for example, this may present as one team's communication system (e.g., communication equipment for head coach one, offensive coordinator one, special teams coordinator one, etc.) being assigned and restricted to ISM frequencies 902-915 Mhz during the contest, while the other team's communication system (e.g., communication equipment for head coach two, offensive coordinator two, special teams coordinator two, etc.) is assigned and restricted to ISM frequencies 916-928 Mhz during the contest. This undesirably restricts the ability of, in the sport's arena, coaches and personnel to communicate with one another over the entire ISM spectrum. Specifically, changing physical channels in a busy frequency spectrum often results in devices moving among other devices occupying the same frequencies, thus generating a "popping" sound (e.g., caused by a lengthy amount of time associated with moving from frequency to frequency) that is able to be heard by all devices on a given frequency.

In the multi-billion dollar a year National Football League (NFL) industry, for example, coaches use communication devices to communicate from coaches in the press box to coaches on the field, amongst each other, and to communicate with players, who might have a miniature receiver in his or her helmet. The best solution for the NFL in today's art is to have a plurality of devices worn on the coach in order to allow for this type of communication. FIGS. 1 and 2 show current prior art views of a communication unit 2 that is typically worn by a football coach during an NFL game. As shown, the unit 2 includes a full duplex transceiver 10 to allow the coach to communicate with other coaches, a walkie talkie 20 in order to enable the coach to communicate with a player on the field, an interface device 30 in order to mate the walkie talkie 20 with the full duplex transceiver 10, a router (shown but not labeled) to assist with connecting the coach to other coaches, and an array of antennas (not shown) needed to be placed near the coaches on the field. This array of antennas (not shown) is provided so that the transceivers associated with a given team will capture the frequency with more power and communicate with each other without talking over other transceivers (e.g., of another team). The proximity to the antennas enables the transceivers for that specific team to do this.

Accordingly, it will be appreciated that this is an excessively large number of devices that each coach must carry on their belt, requiring wasteful time to assemble, complicating their ability to coach, as well as move around the sidelines. Additionally, having such a large number of devices increases the cost of the unit per coach. Furthermore, because of the frequency congestion, two days prior to an NFL game, it is common for a team of engineers to be required to arrive at a stadium and sweep to determine if there are other devices that would interfere with headsets being used for the upcoming game. If other devices are found in the stadium, they are marked and must be turned off during the game in order to prevent interference.

Another drawback with known communication systems pertains to single data distribution (SDD). Specifically, known communication systems that employ a plurality of paired devices (e.g., in a football context, a head coach's communication devices, an offensive coordinator's communication devices, and a special teams' coordinator's communication devices, and all the other coaches that make up the coaching staff) typically have one device (e.g., one of the head coach's communication devices) set up as the SDD device which sends frequency hopping sequences to all of the other paired devices. Accordingly, while all of the paired devices are turned on and communicating with one another, this SDD device instructs each of the remaining devices in the group when and what channel to switch to. However, with today's art, if this SDD device were to fail for any reason, all of the remaining devices in the paired group will no longer be instructed what frequencies to switch to, thereby undesirably ending communication between the remaining devices. Eliminating a single point of failure with today's methods would require excessively large amounts of equipment, as well as down time for the excessive equipment to turn on and establish a sync method for the remaining paired devices to follow, once the SDD device has failed.

For at least the foregoing reasons, an improved communication system, full duplex transceiver assembly and full duplex transceiver amplifier assembly therefor, and associated method are provided herein.

SUMMARY

In accordance with one aspect of the disclosed concept, a communication system includes a plurality of full duplex transceiver assemblies each having an ON condition and an OFF condition, and configured to be worn by a different user, each of the plurality of full duplex transceiver assemblies having a housing and printed circuit board coupled to the housing, the printed circuit board including a transceiver having a microprocessor. Each microprocessor is configured to emit a different stream of controlling data when the plurality of full duplex transceiver assemblies are in the ON condition, thereby allowing each of the plurality of full duplex transceiver assemblies to communicate among a plurality of different logical channels. Embedded with each different stream of controlling data is a unique identification number for grouping each of the plurality of full duplex transceiver assemblies together.

In accordance with another aspect of the disclosed concept, a full duplex transceiver assembly includes a housing, and a printed circuit board coupled to the housing, the printed circuit board comprising a transceiver having a microprocessor. The microprocessor is configured to emit a stream of controlling data when the full duplex transceiver assembly is in an ON condition, thereby allowing the full duplex transceiver assembly to communicate among a plurality of different logical channels with a plurality of other full duplex transceiver assemblies. Embedded within the steam of controlling data is a unique identification number for grouping the full duplex transceiver assembly and the plurality of other full duplex transceiver assemblies together.

In accordance with another aspect of the disclosed concept, a full duplex transceiver amplifier assembly includes a housing, a bi-directional microphone coupled to the housing, a printed circuit board coupled to and disposed within the housing, the printed circuit board comprising a transceiver having a microprocessor, and a bi-directional amplifier, and a speaker electrically connected to the printed circuit board, the amplifier being electrically connected to the microphone, the speaker and the transceiver. The microprocessor is configured to emit a delayed controlling stream of data, thereby allowing audio to pass between the transceiver and the amplifier without feedback, regardless of the amplification level and the proximity of the microphone to the speaker.

In accordance with a further aspect of the disclosed concept, a method of providing a communication system includes the steps of providing a plurality of full duplex transceiver assemblies each having an ON condition and an OFF condition, and configured to be worn by a different user, each of the plurality of full duplex transceiver assemblies comprising a housing and printed circuit board coupled to the housing, the printed circuit board having a transceiver having a microprocessor, emitting a different stream of controlling data with the microprocessor of each of the plurality of full duplex transceiver assemblies when the plurality of full duplex transceiver assemblies are in the ON condition, thereby allowing each of the plurality of full duplex transceiver assemblies to communicate among a plurality of different logical channels, and embedding with each different stream of controlling data a unique identification number for grouping each of the plurality of full duplex transceiver assemblies together.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

DETAILED DESCRIPTION OF THE DISCLOSURE

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

As employed herein, the term "number" shall mean one or an integer greater than one (e.g., a plurality).

As employed herein, the term "coupled" shall mean connected together either directly or via one or more intermediate parts or components.

As employed herein, the term "logical channel" shall mean a communication channel provided by a scaled stream of controlling, advisory, and functional data which is emitted into the RF stream by a microprocessor. In prior art systems, when two transceivers are both on a given fixed frequency, they communicate freely with one another on a channel. On "logical channels", in accordance with the disclosed concept and by way of contrast, the communication channels have digital information embedded in the emitted stream of controlling data, digital information which is passed through a single fixed frequency, thereby allowing multiple transceivers, devices, and functions to operate on that single frequency.

Figure 3:
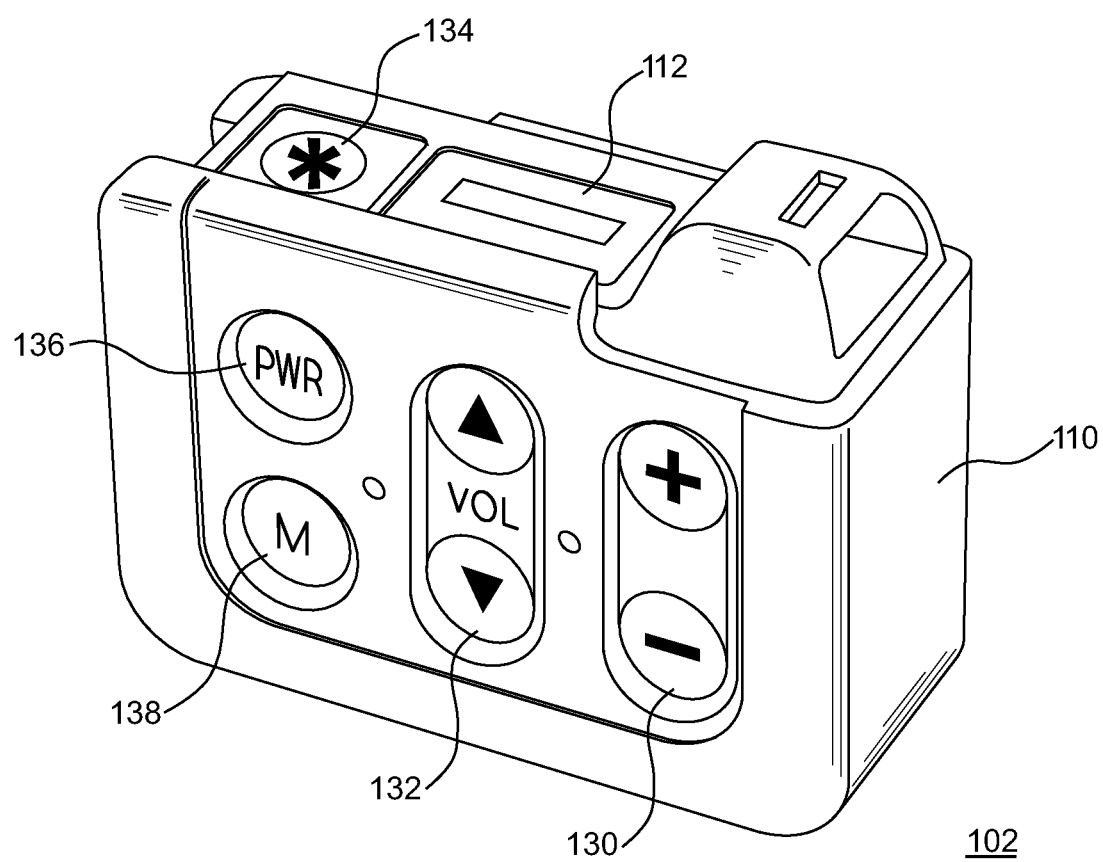
FIG. 3 is an isometric view of a full duplex transceiver assembly for a communication system, in accordance with one non-limiting embodiment of the disclosed concept.
Figure 4:
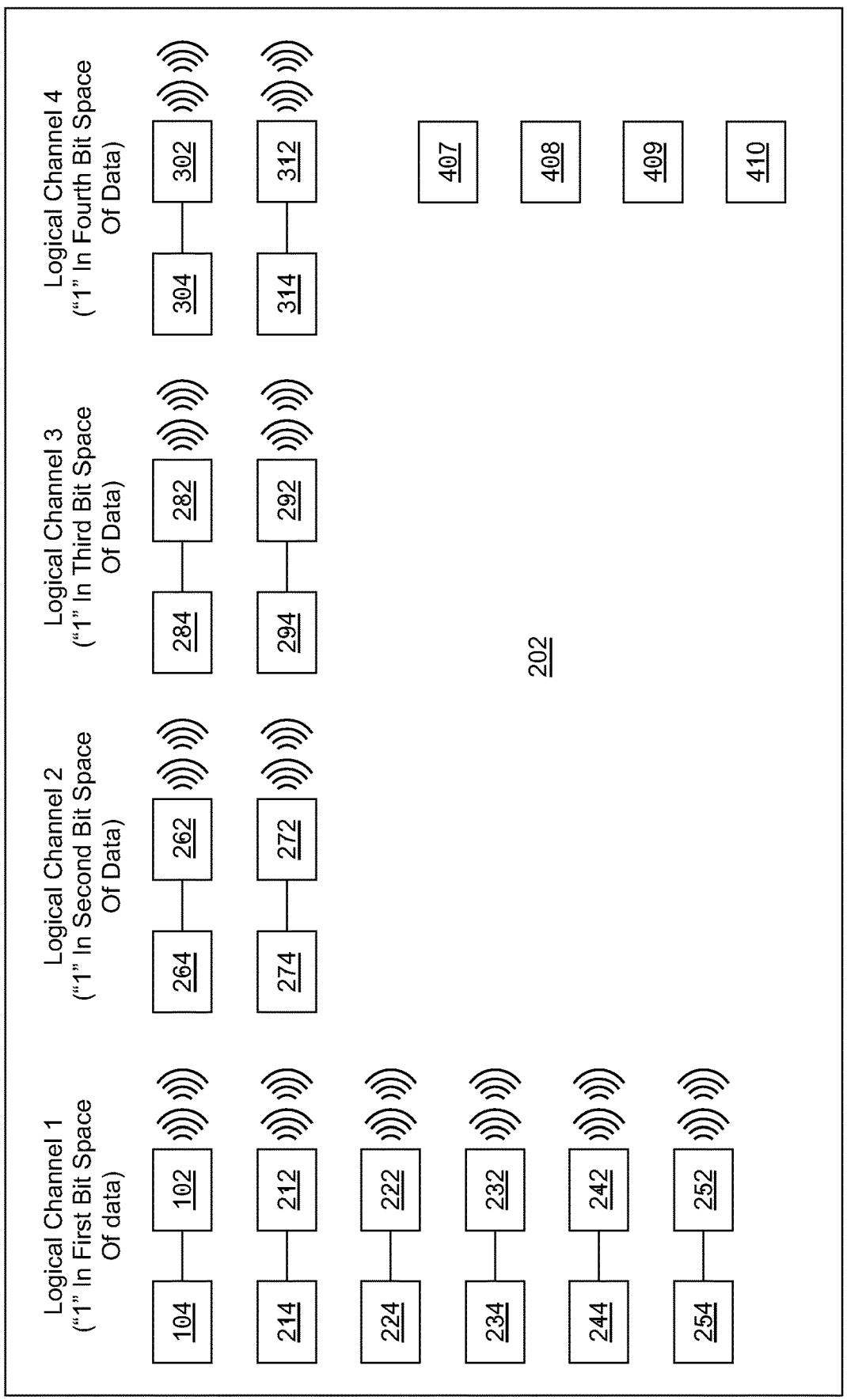
FIG. 4 is a simplified view of a communication system employing the full duplex transceiver assembly of FIG. 3, in accordance with one non-limiting embodiment of the disclosed concept.

FIG. 3 is an isometric view of a full duplex transceiver assembly 102 for a communication system, e.g., communication system 202, shown in simplified form in FIG. 4 wherein 102, 212, 222, 232, 242, 252, 262, 272, 282, 292, 302, and 312 represent full duplex transceiver assemblies, each structured similar to or the same as the full duplex transceiver assembly 102; and 104, 214, 224, 234, 244, 254, 264, 274, 284, 294, 304, and 314 represent headsets that are directly connected with the corresponding full duplex transceiver assemblies. It will be appreciated that each user (e.g., an NFL coach, a firefighter, an airline worker, and/or anyone who requires hands free full duplex communication) within a communication system as disclosed herein, is advantageously configured to be associated with, or, to wear, a single full duplex transceiver assembly and headset. As will be discussed in greater detail below, among other benefits, employing the full duplex transceiver assembly 102 in a communication system such as the communication system 202 significantly improves the ability of communication to occur without interruption, advantageously reduces the amount of equipment needed to be worn in, for example, an NFL contest, and eliminates the need for sweeps to be made in stadiums by teams of engineers before contests. As shown, the full duplex transceiver assembly 102 has a digital display 112, channel adjustment buttons 130, volume adjustment buttons 132, a push to talk button 134, a power button 136, a menu button 138, and a cable controlled voltage feature with its voltage output terminated on two of the six pins located at the microphone connection jack (not shown).

Figure 1:
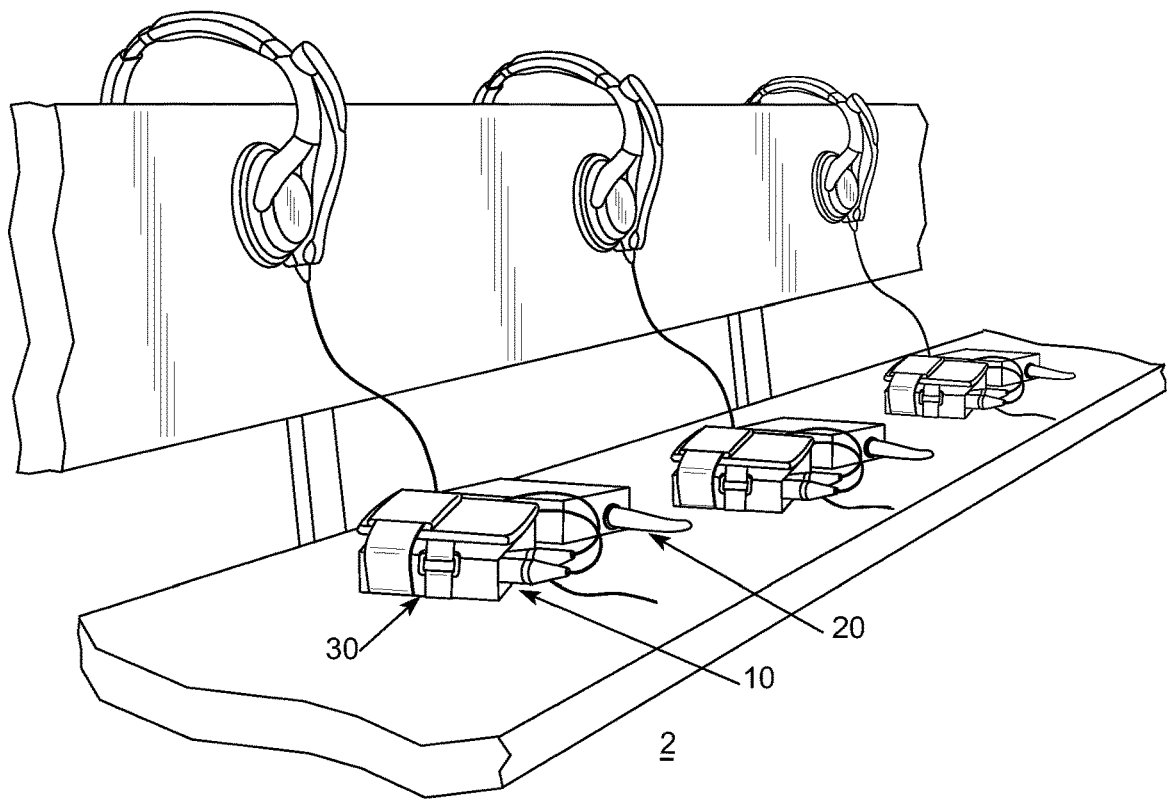
FIGS. 1 and 2 are different views of a prior art unit for a communication system used by coaches in the NFL.
Figure 2:
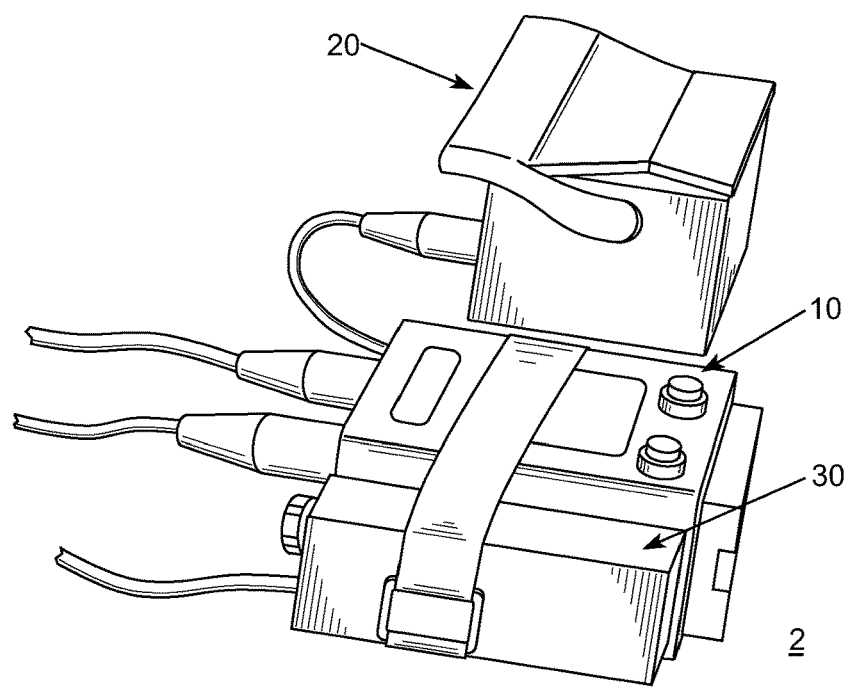

The digital display 112 is configured to display to a user which channel they are on. The channel adjustment buttons 130 of each of the full duplex transceiver assemblies 102, 212, 222, 232, 242, 252, 262, 272, 282, 292, 302, and 312 are electrically connected to a respective microprocessor, and responsive to pushing one of the channel adjustment buttons 130, the full duplex transceiver assemblies 102, 212, 222, 232, 242, 252, 262, 272, 282, 292, 302, and 312 are caused to move among a plurality of logical channels. For example, in the football context, a head football coach desiring to talk to the offensive coordinator might, for example and without limitation, press the channel button until the digital display reads "OFFENSE," and a customized audible "OFFENSE" is heard in the associated headset. Additionally, by pressing the up and down volume adjustment buttons 132, the volume in a corresponding headset attached to the full duplex transceiver assembly is advantageously able to be adjusted. The push to talk button 134 provides a simple mechanism by which, as will be discussed below, communication can be had with, for example, a player on a football field, without the need for a separate communication device and associated equipment (e.g., the walkie talkie 20, interface device 30, and router showed in FIGS. 1 and 2). The push to talk button 134 also serves as the method to allow the controlled voltage to appear on two of the six pins of the microphone connector, or also serve as the mechanism to communicate if the full duplex transceiver assembly 102 is programmed as push to talk instead of full duplex (e.g., talk openly). The power button 136 allows a user to turn the full duplex transceiver assembly on and off, and serve as a method to view the status of the full duplex transceiver assembly 102, such as a battery indicator, User ID, and other devices within the group on the same logical channel. The menu button 138 advantageously functions to mute audio (e.g., if a user presses the button 138, other full duplex transceiver assemblies cannot hear audio from that user), adjust the brightness of the digital display 112, adjust microphone loudness from a user, and allow for a new full duplex transceiver assembly to be programmed to function in a communication system, such as system 202 by providing a pairing method (with a unique pairing code associated with that group of full duplex transceiver assemblies) and user ID assignment). Regarding pairing and user ID assignment, pressing the menu button 138 assigns a user ID to that new full duplex transceiver assembly. Subsequently, pressing the push to talk button 134 will wirelessly pair the full duplex transceiver assembly to other full duplex transceiver assemblies within the system, and will take encryption from other full duplex transceiver assemblies and pair it into the new full duplex transceiver assembly The cable controlled voltage feature provides a further advantageous function of allowing the user of the full duplex transceiver assembly 102 to energize distant equipment. As will be discussed below, this has benefits in other industries, such as the airline industry. This function is selectable in either a momentary voltage or latched voltage output.

Figure 5:
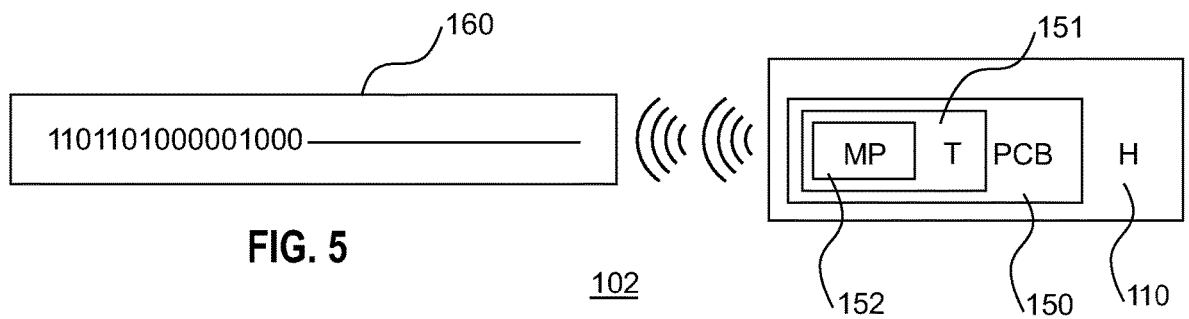
FIG. 5 is a simplified view of the full duplex transceiver assembly of FIG. 3, and shown with a portion of the housing removed in order to see hidden structures.

FIG. 5 is a simplified view of the full duplex transceiver assembly 102 of FIG. 3, and shown with a portion of the housing 110 removed. As shown, coupled to the inside of the housing 110 is a printed circuit board 150. The printed circuit board 150 includes a transceiver 151 having a microprocessor 152. Each of the full duplex transceiver assemblies 102, 212, 222, 232, 242, 252, 262, 272, 282, 292, 302, and 312 has an ON condition and an OFF condition, and when in the ON condition, the microprocessors 152 are each configured to actively emit a number of different streams of identical controlling data 160 consisting of a binary sequence of numbers, thereby allowing each of the plurality of full duplex transceiver assemblies 102, 212, 222, 232, 242, 252, 262, 272, 282, 292, 302, and 312 to communicate among a plurality of different logical channels. The number of different streams of identical controlling data 160 emitted by the microprocessor 152 of the full duplex transceiver assembly 102 are also each different than the number of streams of identical controlling data being emitted by all of the other corresponding microprocessors in the communication system 202, for reasons that will be discussed below. Additionally, it will be appreciated that each of the full duplex transceiver assemblies 102, 212, 222, 232, 242, 252, 262, 272, 282, 292, 302, and 312 is configured to receive the different streams of controlling data of all of the other full duplex transceiver assemblies 102, 212, 222, 232, 242, 252, 262, 272, 282, 292, 302, and 312 at the same time. In one example embodiment, the data is 256 bits long. This data 160 (e.g., and the data from the other full duplex transceiver assemblies) provides a novel mechanism by which the full duplex transceiver assemblies 102, 212, 222, 232, 242, 252, 262, 272, 282, 292, 302, and 312 can communicate with each other. In the example of FIG. 4, the wireless communication symbols represent data that is being emitted by the microprocessors of each of the full duplex transceiver assemblies 102, 212, 222, 232, 242, 252, 262, 272, 282, 292, 302, and 312.

In order for the full duplex transceiver assemblies 102, 212, 222, 232, 242, 252, 262, 272, 282, 292, 302, and 312 to communicate with each other, embedded within each different stream of controlling data 160 (e.g., and the data from the other full duplex transceiver assemblies) that they are emitting is a unique identification number for grouping each of the plurality of full duplex transceiver assemblies 102, 212, 222, 232, 242, 252, 262, 272, 282, 292, 302, and 312 together. Stated differently, in the example of FIG. 4, each of the full duplex transceiver assemblies 102, 212, 222, 232, 242, 252, 262, 272, 282, 292, 302, and 312 is emitting a different unique identification number, which functions to group all of the full duplex transceiver assemblies 102, 212, 222, 232, 242, 252, 262, 272, 282, 292, 302, and 312 together. Additionally, all of the full duplex transceiver assemblies 102, 212, 222, 232, 242, 252, 262, 272, 282, 292, 302, and 312, by having an identification number, know the exact frequency sequence for precise uninterrupted hopping within the group. Furthermore, within the data 160 (e.g., and the data from the other full duplex transceiver assemblies), information (e.g., audio and control information) is sent from transceiver to transceiver, thereby allowing for multiple functions to be performed, and also preventing the auxiliary functions of the full duplex transceiver assemblies from being interrupted by other devices sharing the same physical channel within the communication system 202.

Rather than being passed on a physical channel, the information is passed using the data 160 (e.g., and the data from the other full duplex transceiver assemblies). Stated differently, employing the disclosed method allows all the full duplex transceiver assemblies 102, 212, 222, 232, 242, 252, 262, 272, 282, 292, 302, and 312 within the communication system 202 to be linked together and exchange data amongst themselves. As each of the full duplex transceiver assemblies 102, 212, 222, 232, 242, 252, 262, 272, 282, 292, 302, and 312 emit data that may be 256 bits long, it follows that each of the full duplex transceiver assemblies 102, 212, 222, 232, 242, 252, 262, 272, 282, 292, 302, and 312 may have 256 corresponding logical channels. In turn, the full duplex transceiver assemblies 102, 212, 222, 232, 242, 252, 262, 272, 282, 292, 302, and 312 that are together on one of the 256 logical channels are actually on the same physical channel. For example, and continuing to refer to FIG. 5, if the users of full duplex transceiver assemblies 102 and 212 each have a "1" as the fourth number in their data 160, both full duplex transceiver assemblies 102 and 212 can communicate on that channel. In the example embodiment, the first six logical channels represent channels on which users can communicate in full duplex (e.g., openly talk to each other). With respect to the full duplex transceiver assembly 102 depicted in FIG. 5, this means that, because the sequence of the data 160 begins with "110110", its user can openly communicate on the first, second, fourth, and fifth logical channels by moving the channel buttons 130 (FIG. 3) to those channels. With this improved method of logical channel assignment, one of the full duplex transceiver assemblies 102, 212, 222, 232, 242, 252, 262, 272, 282, 292, 302, and 312 within the same group can receive and transmit data on any one of the logical channel numbers without being interrupted by co-channel users.

In the example of FIG. 4, this corresponds to a significantly improved method of communication. Specifically, if full duplex transceiver assemblies 102, 212, 222, 232, 242, and 252 have a "1" in the first bit space of the controlling data they are emitting, those six full duplex transceiver assemblies 102, 212, 222, 232, 242, and 252 can freely communicate in full duplex on logical channel one. At the same time as full duplex transceiver assemblies 102, 212, 222, 232, 242, and 252 are communicating on logical channel one, if full duplex transceiver assemblies 262 and 272 have a "1" in their second bit spaces of the controlling data they are emitting, they can simultaneously communicate in full duplex on logical channel two. Additionally, while all of this communication is going on with full duplex transceiver assemblies 102, 212, 222, 232, 242, and 252 on the first logical channel, and with full duplex transceiver assemblies 262 and 272 on the second logical channel, full duplex transceiver assemblies 282 and 292 can freely communicate in full duplex on the third logical channel, provided they each have a "1" in their third bit space of the controlling data they are emitting. Additionally, full duplex transceiver assemblies 302 and 312 can simultaneously freely communicate in full duplex on the fourth logical channel, provided they each have a "1" in their fourth bit space of the controlling data they are emitting.

This is depicted in FIG. 4, which shows one of the plurality of sequences the full duplex transceiver assemblies 102, 212, 222, 232, 242, 252, 262, 272, 282, 292, 302, and 312 are configured to have. In the sequence of FIG. 4, two or more of the full duplex transceiver assemblies (in the non-limiting example of FIG. 4 it is the full duplex transceiver assemblies 102, 212, 222, 232, 242, and 252) are on a first logical channel (e.g., have a binary bit "1" in the first space of the controlling data they are each emitting), thereby allowing the users of these full duplex transceiver assemblies 102, 212, 222, 232, 242, and 252 to communicate with each other on the first logical channel in full duplex. Simultaneously (e.g., while full duplex transceiver assemblies 102, 212, 222, 232, 242, and 252 are communicating on logical channel 1 with each other), another two or more of the plurality of full duplex transceiver assemblies (in the non-limiting example of FIG. 4 it is the full duplex transceiver assemblies 262 and 272) are on a second logical channel (e.g., have a binary bit "1" in the second space of the controlling data they are each emitting), thereby allowing the users of these full duplex transceiver assemblies 262 and 272 to communicate on the second logical channel in full duplex. Simultaneously (e.g., while full duplex transceiver assemblies 102, 212, 222, 232, 242, and 252 are communicating on logical channel 1 and full duplex transceiver assemblies 262 and 272 are communicating on logical channel 2), it is contemplated that a further two or more full duplex transceiver assemblies (in the non-limiting example of FIG. 4 it is the full duplex transceiver assemblies 282 and 292) are on a third logical channel (e.g., have a "1" in the third bit space of the controlling data they are each emitting), thereby allowing the users of these full duplex transceiver assemblies 282 and 292 to communicate on the third logical channel in full duplex. Additionally, in the first sequence, an additional two or more of the full duplex transceiver assemblies (in the example of FIG. 4 it is the full duplex transceiver assemblies 302 and 312) are on a fourth logical channel (e.g., have a "1" in the fourth bit space of the controlling data they are each emitting), thereby allowing the users of these full duplex transceiver assemblies 302 and 312 to communicate on the fourth logical channel in full duplex.

As a result of the novel communication system 202, any full duplex transceiver assembly can have a "1" in one or more than one of the bit spaces, thereby providing a communication connection among all of the users on any logical channel. In the NFL, it is important for the head coach to communicate something during the game to all coaches at the same time regardless of what channel they are on. By pressing and holding one of the volume adjustment buttons 132, a "1" is automatically inserted in all logical channels, thus allowing the head coach to make one broadcast that will allow all coaches regardless of the channel they are on to hear the head coach. In addition, pressing the push to talk button 134 allows another "1" to be inserted into the bit space, thereby providing communication to the helmet receiver channel and/or providing output power on two pins.

Moreover, because of the novel method of call distribution, pressing and holding one of the volume adjustment buttons 132 will allow a "1" to be inserted into all bits that provide communication to the helmet receiver, and/or produce voltages on all full duplex transceiver assemblies that are programmed to produce such voltage. As an example, in an airport environment, controlling voltage on full duplex transceiver assemblies is very useful. Pressing the push to talk button 134 will produce voltage on one full duplex transceiver assembly that may turn on one runway light, however pressing and holding one of the volume adjustment buttons 132 will provide output on all full duplex transceiver assemblies, thus turning on multiple runway lights. Another useful feature not employed in today's art is the need to broadcast over pubic safety full duplex transceiver assemblies at the same time. Most fire trucks have more than one radio which they use to communicate on to one or more than one dispatch centers. However, in today's art, the firefighter can only talk on one radio at a time. By interconnecting one of the disclosed full duplex transceiver assemblies 102, 202, 212, 222, 232, 242, 252, 262, 272, 282, 292, 302, and 312 with one or more public safety radios on multiple radio bands, firefighters will advantageously have the ability to communicate to the dispatch centers by pressing their respective push to talk button (e.g., button 134). Each logical channel can connect to a specific radio or radios operating on different bands simply by pressing the push to talk button 134. In addition, in the event of an emergency where mutual aid is needed, the firefighter can simply press and hold the one of the volume adjustment buttons 132, which will activate all radios and provide one single transmission to be broadcast over all public safety bands.

Moreover, because of the novel method of call distribution, pressing and holding one of the volume adjustment buttons 132 will allow a "1" to be inserted into all bits that provide communication to the helmet receiver, and/or produce voltages on all full duplex transceiver assemblies that are programmed to produce such voltage. As an example, in an airport environment, controlling voltage on full duplex transceiver assemblies is very useful. Pressing the push to talk button 134 will produce voltage on one full duplex transceiver assembly that may turn on one runway light, however pressing and holding one of the volume adjustment buttons 132 will provide output on all full duplex transceiver assemblies, thus turning on multiple runway lights. Another useful feature not employed in today's art is the need to broadcast over pubic safety full duplex transceiver assemblies at the same time. Most fire trucks have more than one radio which they use to communicate on to one or more than one dispatch centers. However, in today's art, the firefighter can only talk on one radio at a time. By interconnecting one of the disclosed full duplex transceiver assemblies 102, 202, 212, 222, 232, 242, 252, 262, 272, 282, 292, 302, and 312 with one or more public safety radios on multiple radio bands, firefighters will advantageously have the ability to communicate to the dispatch centers by pressing their respective push to talk button (e.g., button 134). Each logical channel can connect to a specific radio or radios operating on different bands simply by pressing the push to talk button 134. In addition, in the event of an emergency where mutual aid is needed, the firefighter can simply press and hold the one of the volume adjustment buttons 132, which will activate all radios and provide one single transmission to be broadcast over all public safety bands.

Furthermore, the communication system 202 is also advantageous to firefighters fighting to extinguish a fire. It is known that during a fire, firefighters have to hold on to fire hoses. These hoses, due to the immensely large volume of water passing through them, require considerable strength to hold. As such, usage of both hands by a firefighter on the hose is desirable. However, the systems by which today's firefighters communicate today generally require a firefighter holding the hose to remove one of their hands from the hose, press a button on their full duplex transceiver assembly, and communicate to the other firefighters that water flow is at a dangerous pressure and needs to be lowered immediately. This transition is a dangerous moment for a firefighter because the hose is being grasped by only one hand. In accordance with the disclosed concept, a firefighter wearing the full duplex transceiver assembly 102 can communicate in full duplex with other firefighters, who can turn off the water without the firefighter who is holding the hose ever having to let go.

In addition, with respect to safety, in today's systems where a fire fighter uses a standard walkie talkie, this would prevent the fire fighter from communicating with the 911 dispatch center to deploy more resources if the fire was extensive. With the controlled voltage feature that the disclosed concept implements, a fire fighter, in addition to communicating with other team members in full duplex (e.g., speaking openly with one another) within the group, can communicate to the 911 dispatch center. In order to perform this function, the fire fighter can push the push to talk button 134 to activate another device that is connected into a 911 transceiver, which is mounted in a fire truck, other vehicle, or portable that is connected to the 911 dispatch center. This allows the user of the device to have extreme safety by using full duplex communication for team members, as well as direct connect to the 911 dispatch center when pressing the push to talk button 134. Moreover, by pressing one of the volume adjustment buttons 132, a controlled voltage on one or more full duplex transceiver assemblies connected to one or more radios on different bands will be released. As such, if for example different fire departments in different counties were together fighting a fire, firefighters using one of the disclosed full duplex transceiver assemblies who press a volume adjustment button will produce a voltage (e.g., five volts) on other full duplex transceiver assemblies, such as the full duplex transceiver assemblies connected to each bands radio, thereby allowing that firefighter not only communicate on his primary band, but also to communicate on a second band. That is, that firefighter would not have to switch over between channels to talk to a different firefighter and a dispatch center. Stated differently, pressing one button will transmit to different dispatch centers, significantly saving the fire fighter time and also improving safety.

It will also be appreciated that the communication system 202 allows for communication with external receivers, such as external receivers 407, 408, 409, and 410, shown as part of the communication system 202 in FIG. 4. Referring again to FIG. 5, in one example embodiment, bit spaces 7-11 represent channels on which the full duplex transceiver assembly 102 is capable of communicating with the external receivers 407, 408, 409, 410. As the data 160 in this sequence is "100000", the full duplex transceiver assembly 102 is capable of communicating with receivers listening to the seventh logical channel, e.g., the receiver 407 shown in FIG. 4. As such, responsive to the full duplex transceiver assembly 102 pushing the push to talk button 134 (FIG. 3), the full duplex transceiver assembly 102 can communicate with at least one of the external receivers 407, 408, 409, and 410 while still communicating among the plurality of different logical channels, as long as the push to talk button of the full duplex transceiver assembly 102 is being pushed. This allows the receiver 407 to listen to the communication from the full duplex transceiver assembly 102 since it is sending data on one of the logical channels 7-12 associated with the receiver 407, and the logical channels 1-6. It will also be appreciated that any of the other receivers 408, 409, and 410 could also or alternately be programmed to listen to the seventh channel, wherein the full duplex transceiver assembly 102 might communicate with any number of receivers. Additionally, if the user of the full duplex transceiver assembly 212 in the sequence of FIG. 4 were to push its push to talk button, that user could be allowed to communicate with at least one other of the external receivers 408, 409, and 410 while still communicating among the plurality of different logical channels, as long as the push to talk button of the second full duplex transceiver assembly is being pushed. Furthermore, it is contemplated that if the user of the transceiver 212 in the sequence of FIG. 4 were to push its push to talk button, that user could communicate with at least one of the external receivers 407, 408, 409, and 410 while still communicating among the plurality of different logical channels, as long as the push to talk button of the full duplex transceiver assembly 212 is being pushed.

It also follows that if the data were to have a "0" in the seventh data space and a "1" in the eighth data space, the full duplex transceiver assembly 102 would be programmed to communicate with receivers listening to the eighth logical channel instead of the seventh. Additionally, in one example embodiment, the push to talk button 134 feature is provided as the fourteenth bit space of the data 160. Accordingly, if the data 160 provides for a "1" in one of the bit spaces 7-12, it necessarily follows that the data 160 will have a "0" in the fourteenth bit space, as shown in FIG. 5. Moreover, it is also contemplated that if a user of the full duplex transceiver assembly 102 presses and holds one of the volume adjustment buttons 132 (e.g., the down button), a "1" is inserted into its bit spaces 7 to 12, thereby allowing that user to communicate to all receivers at the same time.

In an NFL context, for example and without limitation, this may present as an offensive coordinator wearing the full duplex transceiver assembly 102 pressing the push to talk button 134 in order to allow a quarterback wearing the receiver 407 (e.g., via his or her helmet) to be tuned into, for example, the conversations of the coaches on the offensive logical channel. While typical push to talk features in prior art systems are provided on separate devices, such as the walkie talkie 20 shown in FIGS. 1 and 2, the instant disclosed concept advantageously integrates this feature with the full duplex transceiver assembly 102. As such, it will be appreciated that the communication system 202, in one example embodiment, is devoid of a walkie talkie separate and apart from the plurality of full duplex transceiver assemblies 102, 212, 222, 232, 242, 252, 262, 272, 282, 292, 302, 312. In the NFL context, this presents as a significantly improved unit for a user to wear by consolidating the total equipment to one self-contained full duplex transceiver assembly.

Continuing to refer to FIG. 5, the instant disclosed concept advantageously provides for a group call feature. Specifically, if the data being emitted by one of the full duplex transceiver assemblies has a "1" in, for example, the thirteenth data space, regardless of the logical channel it resides on, that full duplex transceiver assembly has the ability to communicate with every other full duplex transceiver assembly. This may be done by, in one example embodiment, pressing and holding one of the volume buttons 132 (e.g., the volume up button for a predetermined time). In practice, this would present as the full duplex transceiver assembly 102, which does have a "1" in the thirteenth data space of the data 160, pressing and holding the volume up button 132, and in accordingly, being heard by every one of the other full duplex transceiver assemblies 212, 222, 232, 242, 252, 262, 272, 282, 292, 302, and 312. This is advantageous in many contexts. For example, in the NFL, if a head coach wants to communicate with every coach to pass along an important message, the coach can immediately be linked to, and speak to, all of the other coaches, even if they are on different logical channels.

Figure 6:
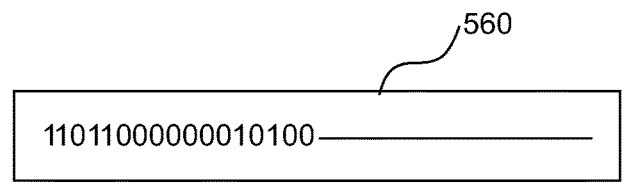
FIG. 6 is an array of data emitted by a full duplex transceiver assembly, in accordance with one non-limiting embodiment of the disclosed concept.

Another advantageous feature of the communication system 202 pertains to the ability of the full duplex transceiver assemblies 102, 212, 222, 232, 242, 252, 262, 272, 282, 292, 302, and 312 to send voltage signals, and to generate a controlled voltage. Specifically, if for example and without limitation, the fifteenth data space of the emitted data is a "1", then that transceiver full duplex transceiver assembly is programmed to activate a cable controlled voltage feature of another full duplex transceiver assembly. For example, FIG. 6 shows an array of data 560 that may be emitted by another full duplex transceiver assembly. As shown, data spaces 7-12 correspond to "000000" and the fifteenth data space is a "1". Accordingly, because data spaces 7-12 are zero, if the user of the full duplex transceiver assembly presses the push to talk button, no communication will be had on one of the seventh to twelfth logical channels. However, in accordance with the disclosed concept, because the data 560 has a "1" in the fifteenth data space, when the user of the full duplex transceiver assembly 212 presses the push to talk button, a signal will be sent to all other full duplex transceiver assemblies (e.g., one or more full duplex transceiver assemblies) within the group that are on the same logical channel, and that also have a "1" in the fifteenth data space, to release a controlled voltage (e.g., without limitation, 5 volts as long as the push to talk button is being pressed). This feature is particularly advantageous in the airline industry, wherein workers on the ground are tasked with guiding planes on and off of runways. These workers rely on lit up runways, and in accordance with the disclosed concept, rather than having to communicate back and forth with control towers to light up runways, these workers can activate their cable controlled voltage features on their full duplex transceiver assemblies, which would prompt a signal to be sent to another full duplex transceiver assembly, which would generate a controlled voltage to automatically turn on the lights for a runway, thereby significantly improving the ability of airplanes to land and take off.

Figure 7:
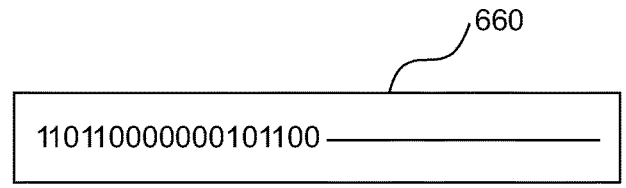
FIG. 7 is another array of data emitted by a full duplex transceiver assembly, in accordance with another non-limiting embodiment of the disclosed concept.

Another advantageous feature of the disclosed concept is that each of the full duplex transceiver assemblies 102, 212, 222, 232, 242, 252, 262, 272, 282, 292, 302, and 312 may include a latch. For example, FIG. 7 shows an array of data 660 that may be emitted by another full duplex transceiver assembly. As shown, data spaces 7-12 correspond to "000000" and the fifteenth and sixteenth data spaces correspond to "11". Accordingly, because data spaces 7-12 are zero, if the user of the full duplex transceiver assembly presses the push to talk button, no communication will be had on one of the seventh to twelfth logical channels. However, if the user presses the push to talk button, a single controlled voltage (e.g., 5 volts of electricity) will be released from the controlled voltage features of the other full duplex transceiver assemblies (one or more of the full duplex transceiver assemblies) within the group that are on the same logical channel, and that also have "11" in the fifteenth and sixteenth data spaces of the data emitted from their full duplex transceiver assemblies. If the user presses the push to talk button a second later time, the 5 volts of electricity will be released. Accordingly, this feature allows for a particularly controlled amount of voltage to be released by the other full duplex transceiver assemblies within the group.

One application of this feature pertains to nuclear power plants. Specifically, in this context, the advantage of the controlled voltage feature is where a user wearing the device can produce a relay closure linking that device to the public switch telephone network allowing for land line or cell phone communication to pass directly to the device. For example, an engineer could be located 1000 miles from the nuclear power plant. That engineer could, upon determining that there is a problem with the nuclear power plant system, place a call to a switch telephone network using a cell phone or land line. Subsequently, a full duplex transceiver assembly in accordance with the disclosed concept could be connected to the switch telephone network. Additionally, a technician and/or others who are wearing full duplex transceiver assemblies paired with the full duplex transceiver assembly connected to the switch telephone network can push a push to talk button, which would let out a voltage in the t full duplex transceiver assembly connected to the network, thereby connecting the engineer to the full duplex transceiver assemblies which might be located at the nuclear power plant. Quick and reliable communication is thus provided, thereby significantly improving the ability of the engineer and technician to solve the problem.

Another advantage of the disclosed concept of logical channel assignment pertains to "call types". "Call types" allow a group of devices within the same group, and while communicating in the same group, to shell out to other independent logical channel and perform two layers of communications, one within the paired group of devices and the other to an independent device associated with one device within the individual group on other logical channels. This is not possible within any device in today's art. It will be appreciated that the communication system 202 can use 256 logical channels in a single group, thereby allowing a device to receive and transmit data from that device on a different logical channel. This means that the channel is only a number in the logical data stream of 256 logical channels.

All of this logical data may then be added to the voice data stream whenever the device sends its voice data. By achieving this in a logical channel format, all devices in the same group automatically knows the assigned logical channel and the data being sent.

Today, the NFL controls how long the coach or coaches can talk to the player with the helmet receiver. The method used today by the NFL is UHF walkie talkies, UHF repeaters and UHF mini receivers. The NFL limits the time the coach can speak to the player. That time begins when the 40 second play clock begins counting down. At 15 seconds, the referee cuts the communication through the repeater to the player. With the disclosed technology, the full duplex transceiver assembly 102 can be connected to the automated play clock controller through the six-pin connection. When the automated play clock controller begins counting down from 40 seconds, a CLOSED contact or an electrical closure is produced, thereby allowing another one of the duplex transceiver assemblies 212, 222, 232, 242, 252, 262, 272, 282, 292, 302, and 312 to communicate with at least one external receiver. Further yet, in one example embodiment, when the CLOSED contact or the electrical closure is produced, at least one of an audible tone in a headset electrically connected to the user of that one of the other full duplex transceiver assemblies or a vibration in that full duplex transceiver assembly to be produced. The audible tone or vibration may also occur at a second later time as well. Connecting two pins from the disclosed full duplex transceiver assembly 102 to the contact relay will initiate the communication path from the coach to the player, thus allowing the coach using one of the disclosed full duplex transceiver assemblies 102, 212, 222, 232, 242, 252, 262, 272, 282, 292, 302, and 312 to communicate with at least one of the external receivers 407, 408, 409, and 410 without the need for a walkie talkie, repeater, or external antenna. Once the automated play clock controller reaches 15 seconds, the CLOSED contact or the electrical closure in the first full duplex transceiver assembly 102 moves to an OPEN state, thus cutting the communication from the other one of the full duplex transceiver assemblies and the at least one external receiver (e.g., coach to the player). This is a significant improvement over today's method.

Additionally, one of the full duplex transceiver assemblies 102, 212, 222, 232, 242, 252, 262, 272, 282, 292, 302, and 312 may be electrically connected to a timer (e.g., a play clock in the NFL context that limits the time an offense has to snap the ball before a penalty flag is thrown) that is configured to countdown from a first time to zero. In accordance with the disclosed concept, responsive to pushing the push to talk button of one of the other full duplex transceiver assemblies (e.g., the full duplex transceiver assembly 212) allows that full duplex transceiver assembly 212 to communicate with the external receivers (e.g., without limitation, earpieces of the offensive players in the NFL context) 407, 408, 409, and 410 as long as the push to talk button of that full duplex transceiver assembly 212 is being pushed and as long as the timer is providing a contact closure. Furthermore, when the timer does not provide the contact closure, the full duplex transceiver assembly 102 prevents the full duplex transceiver assembly 212 from communicating with the external receivers 407, 408, 409, and 410 when the push to talk button of the full duplex transceiver assembly 212 is being pushed.

Accordingly, the disclosed concept contemplates that a method of providing a communication system includes the steps of providing the full duplex transceiver assemblies 102, 212, 222, 232, 242, 252, 262, 272, 282, 292, 302, and 312, emitting a different stream of controlling data with the microprocessor of each of the plurality of full duplex transceiver assemblies 102, 212, 222, 232, 242, 252, 262, 272, 282, 292, 302, and 312 when the plurality of full duplex transceiver assemblies are in the ON condition, thereby allowing each of the full duplex transceiver assemblies 102, 212, 222, 232, 242, 252, 262, 272, 282, 292, 302, and 312 to communicate among a plurality of different logical channels, and embedding with each different stream of controlling data a unique identification number for grouping the full duplex transceiver assemblies 102, 212, 222, 232, 242, 252, 262, 272, 282, 292, 302, and 312 together. It will also be appreciated that providing the full duplex transceiver assemblies 102, 212, 222, 232, 242, 252, 262, 272, 282, 292, 302, and 312 may consist of providing the full duplex transceiver assemblies 102, 212, 222, 232, 242, 252, 262, 272, 282, 292, 302, and 312 without requiring a sweep for interfering external devices. In the NFL context, this corresponds to an extremely simplified method of setup, wherein sweeps of football stadiums, which currently take extensive time prior to kickoff, can be eliminated.

By using logical channel assignments, the communication system 202 is more reliable and stable in terms of transferring and receiving controlled information within a paired group. To achieve this, the communication system 202 adopts the abovementioned frequency hopping method with logical channels and data diversity at the same exact time. One group of devices may use 40 physical frequency channels to hop every 4.6 ms according to a secured sequence randomly generated for each group. As such, the above mentioned method may further include occupying with the full duplex transceiver assembly 102 a first physical frequency for less than 5 milliseconds (e.g., 4.6 milliseconds), hopping the full duplex transceiver assembly 102 to a second physical frequency different than the first physical frequency, occupying with the full duplex transceiver assembly 102 the second physical frequency for less than 5 milliseconds (e.g., 4.6 milliseconds), and hopping the full duplex transceiver assembly 102 to a third physical frequency different than the second physical frequency.

For example, if there is another system other than the communication system 202 using a fixed physical channel 1, and that other system is sending a data stream continually through channel 1, and an existing transceiver hops onto channel 1 to send data, other devices grouped with the existing transceiver could not receive the data due to the interference being caused by the other communication system. In accordance with the disclosed concept, the full duplex transceiver assembly 102 that hops onto channel 1 will occupy channel 1 frequency for only 4.6 ms and will then hop to another frequency. Even though there was interference from the other communication system, the full duplex transceiver assembly 102 only loses one packet of data. However, in addition to this data, multiple data packets are sent using two different channel frequencies. This may be referred to as "data diversity". This means, even though the transceiver loses the first data packet by interference from the other communication system, there is other additional data available through another channel in the logical group via data diversity. This frequency hopping and diversity allows the communication system 202 to have clearer communication because the diversity method provides redundancy. Thus, a much longer frequency range is achieved than known systems, regardless of any congestion.

Additionally, as discussed above, known systems rely on single data distribution (SDD). The instant disclosed concept provides a solution to this problem of having the failure of the SDD be catastrophic to the system's ability to be integrated. More specifically, whichever one of the full duplex transceiver assemblies 102, 212, 222, 232, 242, 252, 262, 272, 282, 292, 302, and 312 is designated as being the SDD (e.g., the device that instructs each of the remaining devices when and what channel to switch to, as well as all of the underlying features that have been assigned to that full duplex transceiver assembly), that full duplex transceiver assembly is programmed to give a "WILL" command to the other full duplex transceiver assemblies 102, 212, 222, 232, 242, 252, 262, 272, 282, 292, 302, and 312 prior to it failing. The "WILL" command outlines the instructions of what needs to be carried out if it were to be in a FAILED state, e.g., likened to a will from a decedent to living relatives. Accordingly, if SDD fails, instructions that are given to the other full duplex transceiver assemblies 102, 212, 222, 232, 242, 252, 262, 272, 282, 292, 302, and 312 program them to know how to operate, e.g., frequency sequences, etc. As such, it will be appreciated that the method further includes embedding within the different stream of controlling data of a first one of the full duplex transceiver assemblies a WILL command in order to allow a second one of the full duplex transceiver assemblies to function as a controller transceiver in case the first full duplex transceiver assembly is in the FAILED state, and responsive to the first full duplex transceiver assembly being in the FAILED state, assigning the WILL command to one or more of the full duplex transceiver assemblies. It is further contemplated that the WILL command is configured to remain with a given full duplex transceiver assembly. As such, it will be appreciated that responsive to the first full duplex transceiver assembly moving from the ON condition to the OFF condition and back to the ON condition, the WILL command stays assigned to the first full duplex transceiver assembly.

It is also within the scope of the disclosed concept for any number of full duplex transceiver assemblies within the communication system 202 that are not assigned a user ID number to join the group by pressing a push to talk button. When these full duplex transceiver assemblies join the group, they will be able to transmit to all conversations on the specific logical channel which they are occupying. Provided there is a user ID for a transceiver to occupy, when the user of that transceiver presses its push to talk button, it will automatically be assigned as a temporary user ID (e.g., temporary user ID 12), thereby allowing the user of this additional full duplex transceiver assembly to communicate with other full duplex transceiver assemblies sharing the same logical channel as long as the push to talk button of this additional full duplex transceiver assembly is being pushed. However, when the push to talk button is released, the temporary user ID is surrendered, thus allowing it to be used by other devices not assigned a user ID.

The temporary user IDs can be understood as floating user IDs. For example, when a given full duplex transceiver assembly surrenders its user ID, a "1" in a data space (e.g., the fourth data space) will change to a "0" in that data space. At that time, if one of the other full duplex transceiver assemblies that does not currently have a user ID presses its push to talk button, and no other full duplex transceiver assembly has yet occupied the now surrendered user ID, that full duplex transceiver assembly will then have a "0" in its fourth data space be changed to a "1," thereby allowing that full duplex transceiver assembly to communicate with anyone on the fourth logical channel in full duplex, as long as the push to talk button is being pressed.

It is also understood that in the football context, certain coaches (e.g., head coach, offensive coordinator, defensive coordinator) may never surrender their user IDs, e.g., they are dedicated. Stated differently, with these coaches, it is understood that full duplex transceiver assemblies with floating user IDs can never occupy the dedicated user IDs. However, for example and without limitation, other coaches (e.g., an offensive line coach) may surrender their user IDs as described above, thereby allowing any number of full duplex transceiver assemblies with floating user IDs to temporarily occupy any unoccupied user ID.

Figure 8:
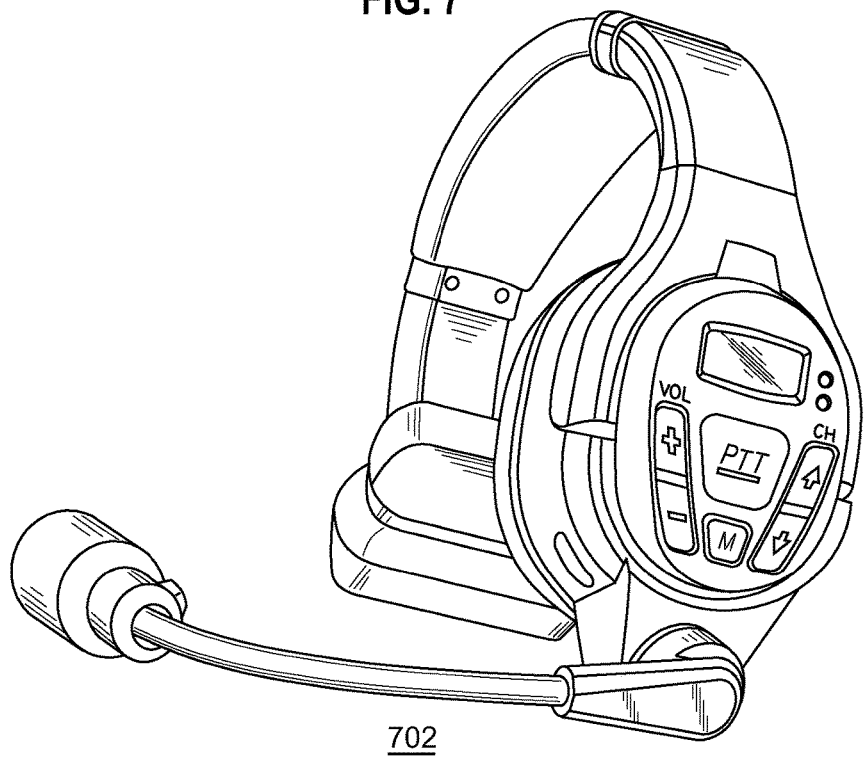
FIG. 8 is an isometric view of a headset assembly, in accordance with one non-limiting embodiment of the disclosed concept.
Figure 9:
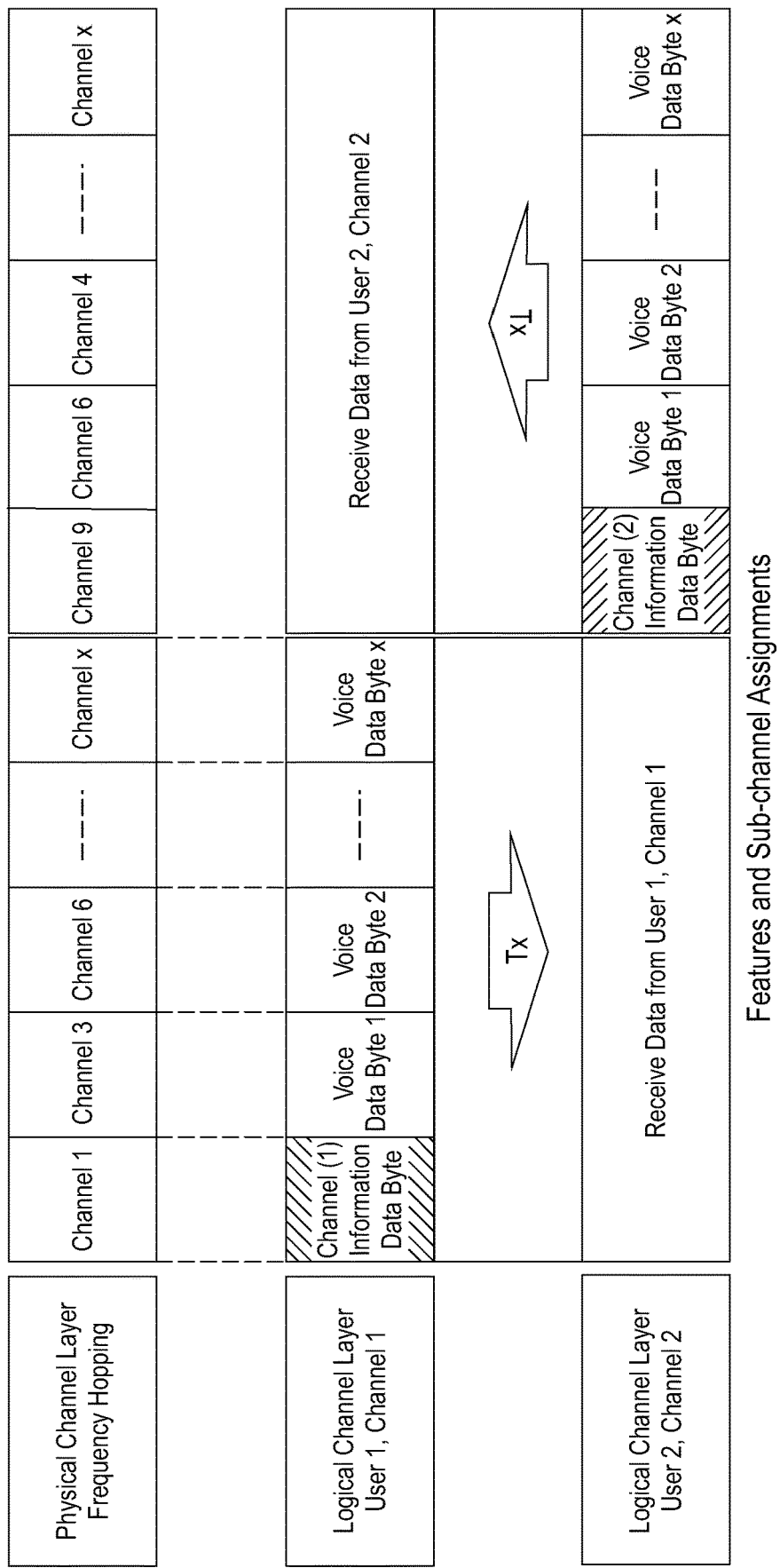
FIG. 9 is a chart of features and sub channel assignments, in accordance with embodiments of the disclosed concept.
Figure 10:
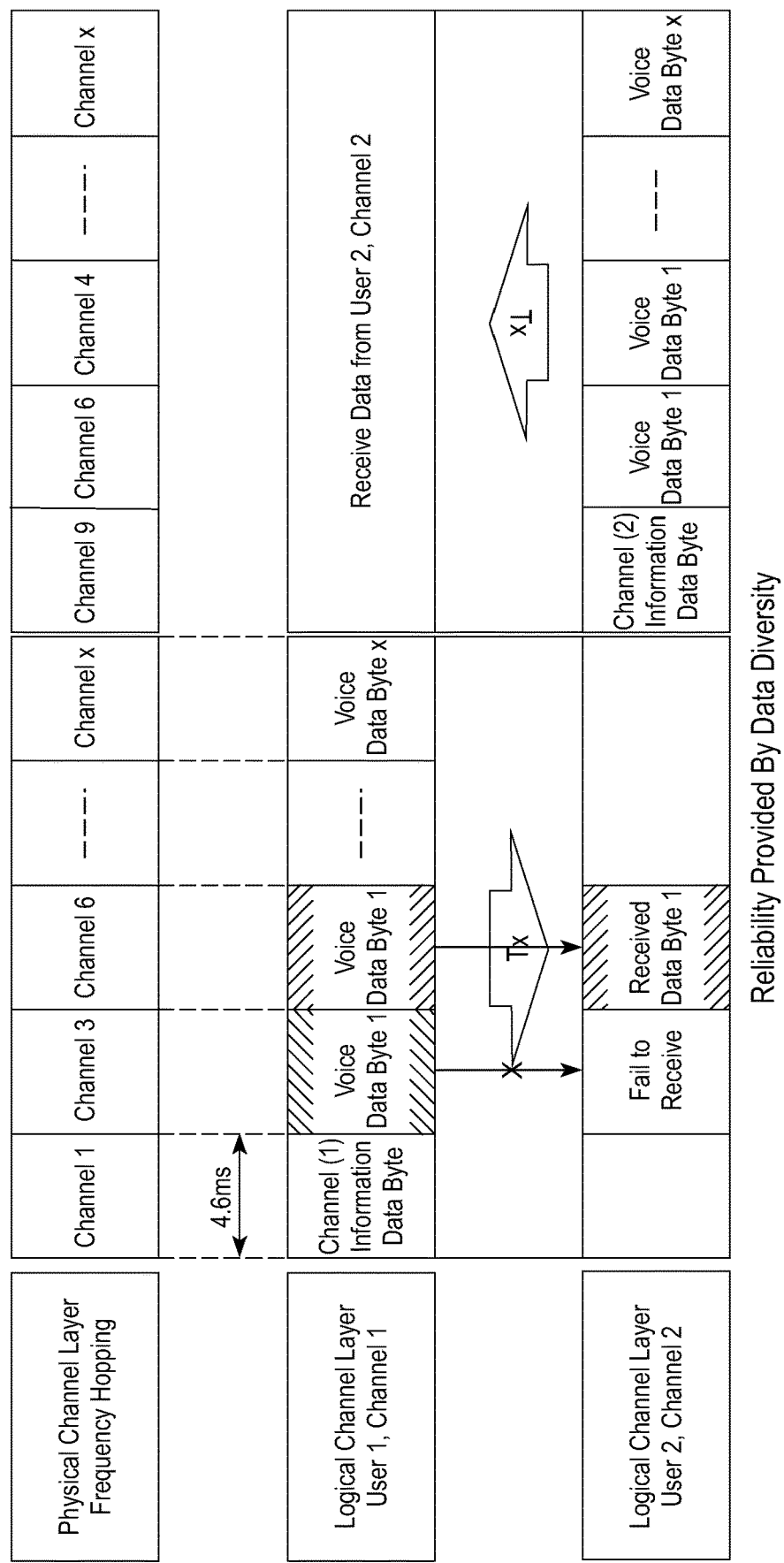
FIG. 10 is a chart of reliability provided by data diversity, in accordance with embodiments of the disclosed concept.

Moreover, the disclosed floating user ID assignment is not limited to being permitted by the pressing of a push to talk button. In accordance with the disclosed concept, the headsets 104, 214, 224, 234, 244, 254, 264, 274, 284, 294, 304, and 314 are each configured to have microphone booms electrically connected to respective full duplex transceiver assemblies, and that rotate between UP and DOWN positions, corresponding to a position where a user will not (UP) be heard and a position where a user will be heard (DOWN). See, for example, headset assembly 702 in FIG. 8, showing a microphone boom (shown but not labeled) in a DOWN position. Similar to the aspects described above with respect to pressing the push to talk buttons to temporarily occupy surrendered user IDs, the communication system 202 is configured to have non-dedicated full duplex transceiver assemblies (e.g., full duplex transceiver assemblies that are not assigned user IDs) be permitted to join a group by moving their respective microphone booms from the UP position to the down position, and exit a group by moving their respective microphone booms from the DOWN position to the UP position. When this transfer occurs, the results are the same as the above described wherein a pressing a push to talk button automatically automatically occupies an unused user ID from the surrendered transceiver. Stated differently, when the user lowers his or her microphone boom to the down position, his or her full duplex transceiver assembly will receive an electrical signal from the microphone boom and automatically have a bit space in its emitting data change from a "0" to a "1" in an unoccupied user ID, thereby allowing him or her to communicate on that logical channel as long as his or her microphone boom is down. It is also contemplated that users may surrender the current user IDs and occupy an unoccupied user ID by raising and lowering their respective microphone booms. That is, if a non-dedicated (e.g., a coach other than a head coach, offensive coordinator, defensive coordinator, or other coach that the team determines shall not surrender its user ID) coach raises his or her microphone boom, he or she will automatically surrender his or her user ID, thereby allowing a floating full duplex transceiver assembly to occupy the now surrendered user ID by lowering his or her microphone boom (e.g., and also by pressing his or her push to talk button). This aspect of the disclosed concept advantageously allows for many more full duplex transceiver assemblies to join the group beyond a predetermined limit (e.g., 12). Furthermore, by eliminating the need to use the push to talk button, users can communicate with two hands free, advantageously allowing them to take notes. That is, it will be appreciated that while the full duplex transceiver assemblies 102, 212, 222, 232, 242, 252, 262, 272, 282, 292, 302, and 312 comprise the disclosed communication system 202, any number of additional full duplex transceiver assemblies may be included in the system, and occupy given user IDs as just described when non-dedicated users (e.g., an offensive line coach as described above) surrender their user IDs.

Because logical channels are being employed as the channels through which information is being passed, one or more of the full duplex transceiver assemblies 102, 212, 222, 232, 242, 252, 262, 272, 282, 292, 302, and 312 can communicate on one logical channel in full duplex (e.g., free to speak openly with each other). Additionally, at the exact same time, one or more of the devices can have a separate communication path to another device on a separate logical channel performing the above mentioned functions. This is not possible in existing methods of full duplex communication. For example, known systems for communicating require the use of push to transmit and release to listen buttons if more than two transceivers are being used. This is commonly used in first responder walkie talkies as well as mobile radios that emit a digital stream. However, the digital stream is only emitted when the push to talk buttons are being pressed. This is inconvenient because it limits the amount of devices that can communicate in full duplex, e.g., typically only two devices. In accordance with the disclosed concept, a controlling stream of data is being continually emitted in order to allow full duplex communication among the paired devices. This advantageously allows significantly more devices to communicate in full duplex and also allows communication without always requiring a push to talk button to be pressed.

Moreover, in time delay multiple access (TDMA), there are limits to the amount of devices that can communicate in full duplex. For example, a typical TDMA device used in first responder radios allows multiple paths of communication to two separate transceivers. With more than two transceivers, in typical TDMA, these devices have to be push to talk because the transceivers occupy a specific channel in the TDMA method. Stated differently, with typical TDMA devices, only two devices can readily communicate in full duplex. The addition of a third device would undesirably require the other two devices to operate in push to talk simplex mode. This is again different from the disclosed concept, wherein logical channels advantageously allows for multiple (e.g., in the disclosed communication system 202 the number is at least 12 full duplex transceiver assemblies, however any number greater than two is contemplated), full duplex transceiver assemblies to communicate in full duplex at the same time.

In an alternative embodiment of the disclosed concept, FIG. 8 shows a headset assembly 702 incorporating a full duplex transceiver assembly in an earpiece of a headset. It will be appreciated that the headset assembly 702 is configured to function exactly the same as the full duplex transceiver assembly 102 and headset 104, discussed above. However, by being integrated into one self-contained subassembly, the headset assembly 702 advantageously provides for a more comfortable experience for users. Accordingly, a plurality of full duplex transceiver assemblies of an alternative communication system may include a plurality of headsets that are each integrated with a corresponding full duplex transceiver assembly (e.g., one of the full duplex transceiver assemblies 102, 212, 222, 232, 242, 252, 262, 272, 282, 292, 302, and 312) so as to form a plurality of self-contained subassemblies each devoid of an external cord between a corresponding full duplex transceiver assembly and a corresponding headset. Additionally, an alternative communication system may have headsets/transceivers integrated as just described, as well as headsets/transceivers electrically connected by external cords.

Figure 11:
FIG. 11 shows a conventional sideline huddle wherein multiple players are gathered around a coach to discuss game strategy.
Figure 12:
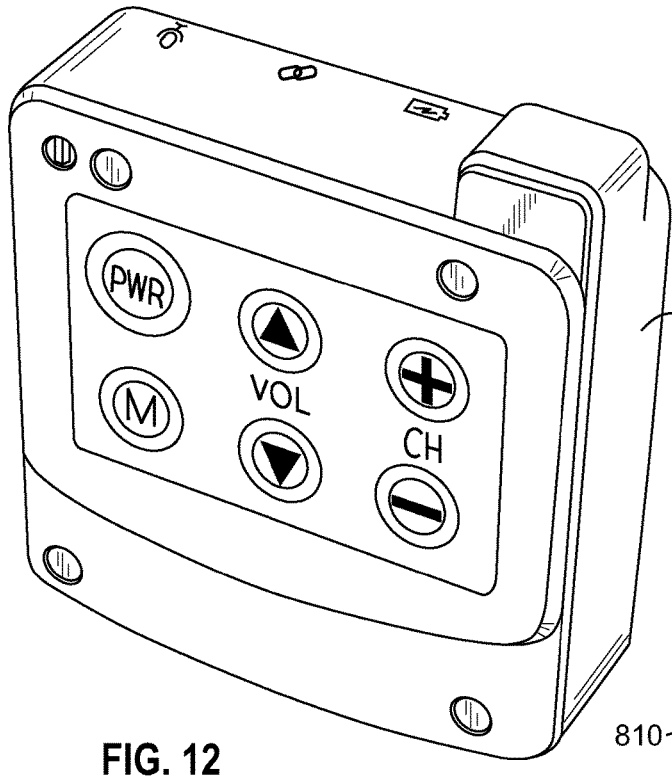
FIGS. 12 and 13 show different views of a full duplex transceiver amplifier assembly, in accordance with one non-limiting embodiment of the disclosed concept.
Figure 14:
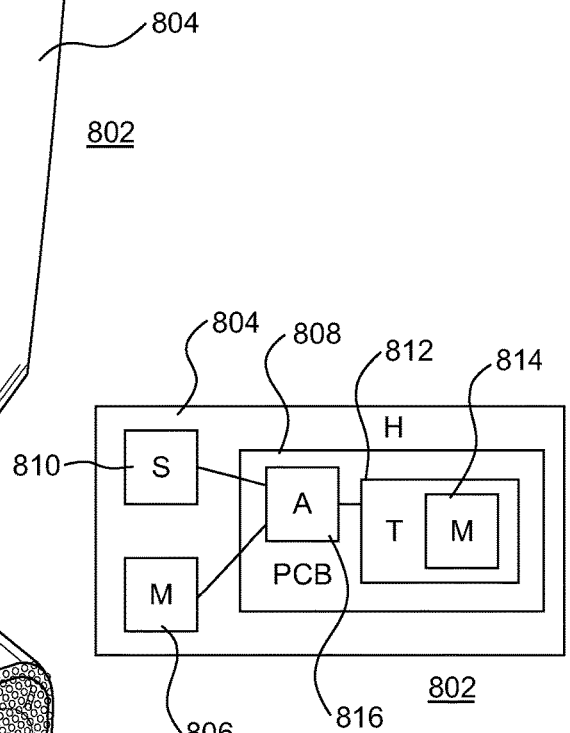
FIG. 14 is a simplified view of the full duplex transceiver amplifier assembly of FIGS. 12 and 13.
Figure 13:
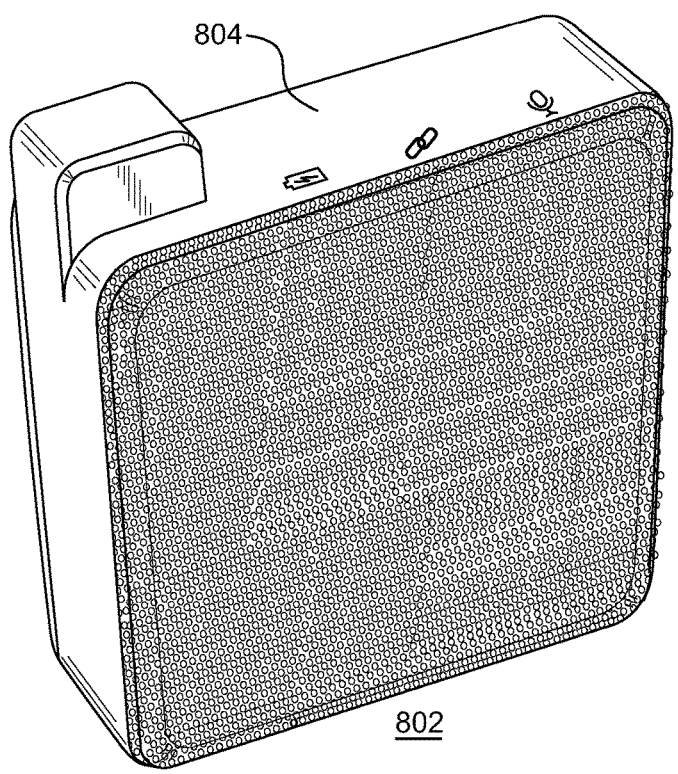

FIG. 11 shows a conventional sideline huddle wherein multiple players are gathered around a coach to discuss game strategy. In this conventional method, the coach proximate the players may listen to another coach (e.g., an offensive coordinator) in a press box, and relay what that coach is saying to the surrounding players. This is an inefficient method because all of the players on the ground cannot hear the coach in the press box, and also cannot talk to the coach in the press box. In a further alternative embodiment of the disclosed concept, FIGS. 12 and 13 show a full duplex transceiver amplifier assembly 802 configured to remedy these deficiencies of conventional methods. The assembly 802 includes a housing 804, a bi-directional microphone 806 (shown in simplified form in FIG. 14) coupled to the housing 804, a printed circuit board 808 (shown in simplified form in FIG. 14) coupled to and located within the housing 804, and a speaker 810 (shown in simplified form in FIG. 14) electrically connected to the printed circuit board. The printed circuit board 808 includes a transceiver 812 having a microprocessor 814, and a bi-directional amplifier 816 electrically connected to the microphone, the speaker and the transceiver. The transceiver of the assembly 802 is preferably configured exactly the same as the transceivers of the full duplex transceiver assemblies 102, 202, 212, 222, 232, 242, 252, 262, 272, 282, 292, 302, and 312, discussed above.

Additionally, the microprocessor of the transceiver 812 of the communication assembly 802 is configured to emit a delayed controlling stream of data, thereby allowing audio to pass between the transceiver 812 and the amplifier 816 without feedback, regardless of the amplification level and the proximity of the microphone to the speaker. It is understood in the art that when a microphone and an amplifier are in close proximity to one another, and audio from the microphone is received at the amplifier, some of the resulting audio from the amplifier passes back into the microphone, a situation known as feedback. However, in accordance with the disclosed concept, the microprocessor 814 advantageously emits a delayed controlling stream of data (e.g., delayed at least 4 milliseconds), thereby eliminating any possibility for undesirable feedback. Accordingly, when players on the field are in close proximity to the assembly 802, they will easily hear communications on whatever logical channel the assembly's 802 transceiver is on via the microphone of the assembly 802, and will also be able to communicate with a coach (e.g., an offensive coordinator in a press box) listening to the same logical channel as the transceiver 812 of the communication assembly 802 by speaking into the microphone of the assembly 802. It will be appreciated that these advantages are achieved via one self-contained subassembly 802, rather than a conglomeration of separate components wired together. It will also be appreciated that the assembly 802 has all of the same functions and capabilities as the full duplex transceiver assemblies 102, 202, 212, 222, 232, 242, 252, 262, 272, 282, 292, 302, and 312.

It will also be appreciated that the firmware within the full duplex transceiver assemblies disclosed herein may be updated. For example, because the array of data (e.g., the 256 bit data) is a data stream, the assigned bits at any one time can be changed by updating the firmware. As disclosed herein, bit spaces 1-6 corresponded to talking channels while bit spaces 7-12 corresponded to communication pathways to external receivers. If the number of voice channels were desired to be expanded to eight instead of six, and eight for communication with external receivers instead of six, then bit spaces 0-8 would correspond to full duplex talk logical channels, and bit spaces 9-16 would correspond to communication pathways to external receivers. Additionally, if additional features in addition to group call, push to talk, controlled voltage, etc., were desired, the firmware could also be updated to provide for these additional features.

It will also be appreciated that a communication system in accordance with the disclosed concept is configured to provide for supervisory control. More specifically, one full duplex transceiver assembly may control another full duplex transceiver, yielding numerous benefits. For example, as each of the microprocessors of the full duplex transceiver assemblies (e.g., full duplex transceiver assemblies structured similar to the assembly 102, discussed above, and also configured for supervisory control) are emitting arrays of data (e g, similar to the arrays of data 160, 560, 660, discussed above), pressing a button (e.g., without limitation, a push to talk button) of a first full duplex transceiver assembly causes at least one data space in the array of data emitted by a second full duplex transceiver assembly to change from "0" to "1". When at least one of those data spaces in the array of data emitted by the second full duplex transceiver assembly is a "0", a user of that second full duplex transceiver assembly is prevented from communicating with, for example and without limitation, a number of external receivers of such a communication system. However, when those one or more data spaces change to "1", the user of the second full duplex transceiver assembly is permitted to communicate with the number of external receivers via pressing of the corresponding button. This may present, in one non-limiting embodiment, in an NFL context wherein a referee presses a button on a first full duplex transceiver assembly to allow a coach using a second full duplex transceiver assembly to communicate with external receivers worn by football players, e.g., the data space of the coach's assembly changes from "0" to "1" in the appropriate location in the array of data responsive to the pushing of the button of the referee's assembly, allowing the coach to communicate with players via pressing his or her push to talk button.

It will also be appreciated that at least one of the full duplex transceiver assemblies 102, 212, 222, 232, 242, 252, 262, 272, 282, 292, 302, and 312 is configured to scan a frequency band (e.g., without limitation, the ISM band) to determine the most optimal frequencies for the communication system 202 to use in order to avoid co-channel and/or co-user interference. This may present as a controlling full duplex transceiver assembly (e.g., a full duplex transceiver assembly programmed to give a "WILL" command to the other full duplex transceiver assemblies 102, 212, 222, 232, 242, 252, 262, 272, 282, 292, 302, and 312 prior to it failing) scanning the frequency band to select a number of frequencies (e.g., without limitation, greater than 10) to determine which frequencies are in use and which are not, and then populating this information. This full duplex transceiver assembly may, in one example embodiment, have a routine in the firmware to scan for RSSI levels to determine which frequencies have higher or lower levels of interference. This information may then be stored in a programmable storage array in order to tell the microprocessor of that full duplex transceiver assembly which frequencies to hop to. This information is then transmitted to the associated full duplex transceiver assemblies to populate their microprocessors with the current hopping pattern of chosen frequencies in order to continue communication on the best frequencies in the frequency band being scanned.

In accordance with an additional embodiment of the disclosed concept, a communication system similar to the communication system 202 is configured to allow for a number of individual full duplex transceiver assemblies to hear the user of a certain full duplex transceiver assembly (e.g., a Director) at a reduced volume. This could be useful in the film industry wherein there may be a "Director's"

channel, a "Lighting Channel," a "Sound Channel", etc., and different users of full duplex transceiver assemblies (e.g., assemblies performing all of the functions of and being structured similar to the assemblies 102, 212, 222, 232, 242, 252, 262, 272, 282, 292, 302, and 312) are on these different physical channels while communicating with each other. These channels may be logical channels wherein users on a given channel are on the same physical frequency, and users on a first logical channel are on a first physical frequency and users on a second logical channel are on a second physical frequency. Continuing, if a Director is on the "Director's" channel, the other members of the filming crew can hear him on the "Lighting and Sound" channels at a reduced volume. This allows everyone to hear what the director is doing.

More specifically, a routine within the firmware of any one of the full duplex transceiver assemblies can be turned on and off to allow the aforementioned to occur. This is done by adding two additional bits of data to the arrays of data being emitted from the full duplex transceiver assemblies, e.g., similar to the arrays of data 560, 660, discussed above. In one example embodiment, if both of the bits of data of a first one of the full duplex transceiver assemblies (e.g., an assembly configured similar to the assembly 102) are "0", then the aforementioned reduced volume advantages will not be realized. However, if both of those bits of data in the exemplary non-limiting embodiment, are "1" in the array of data emitted by that full duplex transceiver assembly, then any of the other full duplex transceiver assemblies in the system that have a "1" in a predetermined programmed feature data space will be able to hear the user of the first full duplex transceiver assembly (e.g., a Director on a film set) at a reduced volume, thus allowing the users of those other full duplex transceiver assemblies to always hear what the director (e.g., the user of the first full duplex transceiver assembly) is saying. In addition, all of the users of full duplex transceiver assemblies who are on the same physical channel as the user of the first full duplex transceiver assembly will hear that user at a 100 percent, non-reduced volume level, while users on other channels will hear the user of the first full duplex transceiver assembly at reduced volume levels.

By employing channel assignment in accordance with the abovementioned teachings and methods, significant improvements over the existing art can be realized. More precisely, in today's art, a separate receiver must be dedicated to each channel, mixers are required to allow the audio to mix between channels, and patch cords are required to allow transceivers to always hear the Director. In other words, today's systems require significantly large amounts of additional equipment, as well as additional setup and assembly to perform functions which the disclosed concept (e.g., the self-contained subassemblies of the full duplex transceiver assemblies as just described), is able to do with zero setup and zero additional receivers or mixers.

In yet an additional embodiment of the disclosed concept, full duplex transceiver assemblies (e.g., assemblies configured the same as 102, 212, 222, 232, 242, 252, 262, 272, 282, 292, 302, and 312, but also having additional features) are configured to have a routine built into their firmware in order to be set to a preset mode (e.g., without limitation, a REFEREE mode in the football context). In accordance with the disclosed concept, when these full duplex transceiver assemblies are in the preset mode, their arrays of emitted data, e.g., similar to the arrays of data 560, 660, have a "1" in a predetermined bit of data (e.g., without limitation, a bit in at least one of spaces 20-30).

The preset mode (e.g., REFEREE mode) functions as follows. A first channel may be automatically set to "push to talk". When users of full duplex transceiver assemblies in accordance with the instant embodiment are on the first channel, those users are by default in a MUTED RECEIVE mode with a TRANSMIT microphone of the full duplex transceiver assembly muted (e.g., by virtue of having the "1" in the predetermined bit of data as just described). If those users press and hold their push to talk buttons, their respective full duplex transceiver assemblies switch from a MUTED RECEIVE mode to an UNMUTED TRANSMIT mode. At that point, the users pressing and holding the push to talk buttons can communicate with each other on that first channel, although the ones not pressing the push to talk button could still hear the conversation. One situation where this is advantageous is in the football context, wherein a referee may be running up and down the field, and by virtue of being in a MUTED RECEIVE mode, no other crew members on that channel will hear that referee laboring for oxygen.

The preset mode (e.g., REFEREE mode) also functions as follows. A second channel automatically mutes the user of a given full duplex transceiver assembly who has a "1" the predetermined bit of data, as just described. When that user subsequently presses the push to talk button, it becomes latched such that the user no longer has to hold the push to talk button to be heard. In other words, the user only has to press the button once to switch from a MUTED RECEIVE mode to an UNMUTED TRANSMIT mode. This is advantageous in situations where, for example and without limitation, in the football context a referee has to talk to a replay booth. In the instant embodiment, the referee will not have to continually hold the push to talk button, but can press it once, and have a lengthy conversation, before pressing it again at the end to switch the assembly back to a MUTED RECEIVE mode. This feature also allows the referee to communicate with a remote location via telephone, VOIP or internet that might be watching all replays for all games being played that day.

In yet a further embodiment of the preset mode, a third channel also automatically mutes the user of that full duplex transceiver assembly, and latches that user full duplex transceiver assembly responsive to pressing the push to talk button. This third channel in the preset (e.g., REFEREE) mode may be a live feed to a PA system and/or to a TV broadcast, as an example. This feature is advantageous so that, in the example football context, users can get their thoughts together on what to say and what hand signals to use to alert the crowd and TV audience of what the penalty is.

In yet an additional embodiment of the disclosed concept, when a user of a first one of the full duplex transceiver assemblies in the preset mode presses its push to talk button, at least one of an audible tone in a headset electrically connected to a second one of the full duplex transceiver assemblies in the preset mode or a vibration in the second full duplex transceiver assembly is produced. This may be achieved via the instant first and second full duplex transceiver assemblies each having a "1" in a predetermined bit space of data, e.g., one of bit spaces 20-30 of an array of data similar to the arrays of data 560, 660.

It will also be appreciated that each of the first, second, and third channels just described may be provided as logical channels, in one example embodiment, wherein each of the full duplex transceiver assemblies on a first logical channel are on the same first physical channel, the assemblies on a second logical channel are on the same second physical channel, and the assemblies on a third channel are on the same third physical channel.

It will also be appreciated that in today's football context, e.g., NFL or NCAA, referees typically carry three items on their person. They carry a transceiver in order to talk to the other members of the refereeing crew, wherein an external button must be pressed before they can speak to the crew. If there is a penalty that is under review, the referee must go to the sideline and grab yet another headset system so he or she can talk to the replay official to decide if the play was valid (e.g., perhaps an incomplete pass or a player stepped out of bounds). Additionally, there is a wireless transmitter that allows the referee to communicate with the public address system and TV broadcast to the crowd what the penalty is. This is a cumbersome situation. In accordance with the disclosed concept, as just described, all of the aforementioned functions and advantages can be achieved in the communication system including the self-contained full duplex transceiver assemblies without the excessive extra equipment required in today's art.

Figure 15:
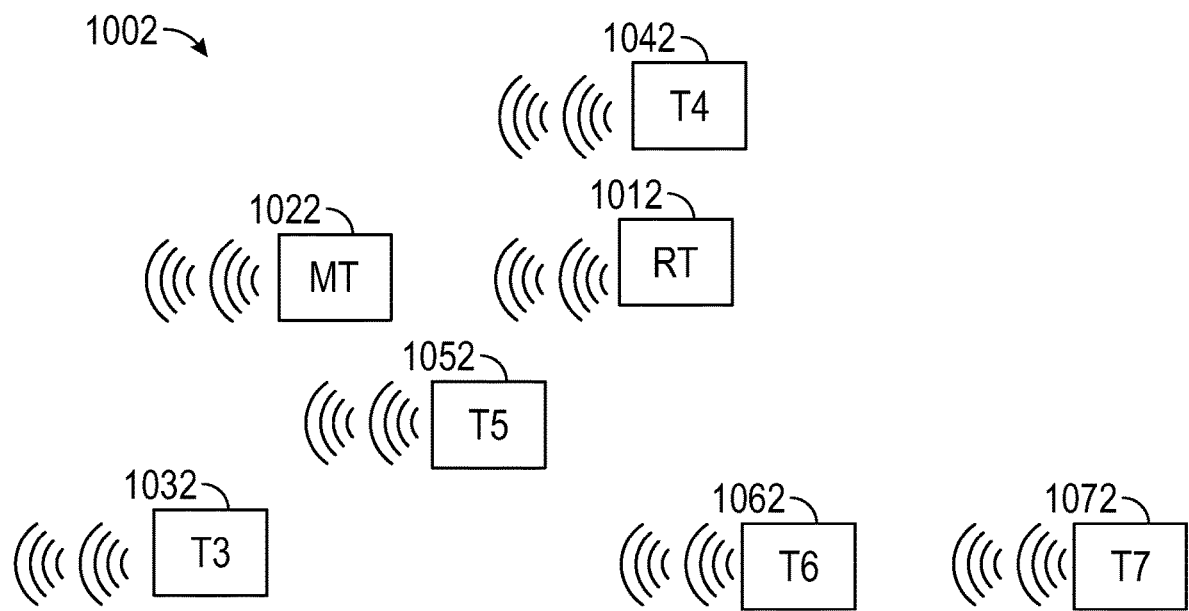
FIG. 15 shows a simplified view of another communication system, including a repeater full duplex transceiver assembly, in accordance with another non-limiting embodiment of the disclosed concept.

In another example, as shown in FIG. 15, a communication system 1002 includes a number of full duplex transceiver assemblies 1012,1022,1032,1042,1052,1062,1072 each having a microprocessor (not shown, but see FIG. 5) configured to emit a stream of data. The assemblies 1022, 1032,1052,1042,1062,1072 are configured to communicate among a plurality of different channels (e.g., logical channels). The transceiver assembly 1012, which may be a repeater transceiver assembly, is configured to emit a stream of data having a predetermined bit or bits inserted into a predetermined bit space or bit spaces thereof in order to cause a signal including the stream of data of the second full duplex transceiver assembly 1022 (e.g., master transceiver 1022) to be repeated, thereby allowing a user of the third full duplex transceiver assembly 1032 to communicate with a user of the fourth full duplex transceiver assembly 1042 among the plurality of different channels, even when the third and fourth full duplex transceiver assemblies 1032, 1042 are physically out of range to communicate directly with one another. Simultaneously, the repeater transceiver assembly 1012 is configured to repeat signals corresponding to slave transceiver assemblies 1032,1042,1052,1062,1072. Accordingly, in a scenario in which the third and fourth transceiver assemblies 1032,1042 are not able to communicate because the signal strength, which is dependent on the physical distance of the devices from one another, is too low, the repeater transceiver 1012 allows users of these transceivers to communicate with one another. Furthermore, it will be appreciated that the other full duplex transceiver assemblies 1022,1032,1042,1052,1062,1072 are configured to have a different predetermined bit or bits inserted into the corresponding bit space(s) as the abovementioned bit spaces of the repeater transceiver assembly 1012. Furthermore, it will be appreciated that in the example of FIG. 15, the third transceiver assembly 1032 can communicate with the fifth full duplex transceiver assembly 1052 without the need for the services of the repeater transceiver assembly 1012. The same holds for the sixth and seventh transceiver assemblies 1062,1072, and these transceiver assemblies 1062,1072 can communicate with the repeater transceiver assembly 1012 to extend range via the master transceiver assembly 1022/ repeater transceiver assembly 1012 connection to out of range transceiver assemblies (e.g., the fourth transceiver assembly 1042), or without the repeater transceiver assembly 1012 to communicate with in-range transceiver assemblies.

Moreover, the master transceiver 1022 preferably has a predetermined bit or bits inserted into a predetermined bit space or bit spaces thereof in order to allow it to function as a master transceiver, as will be discussed below, wherein the other transceiver assemblies 1032,1042,1052,1062,1072 preferably have a different predetermined bit or bits inserted into the same bit space(s) (e.g., as those that make the master transceiver 1022 the master), in order to allow these other transceiver assemblies 1032,1042,1052,1062,1072 to each function as a slave transceiver assembly.

Additionally, the transceiver assemblies 1022,1032,1042, 1052,1062,1072 have a plurality of sequences, for example wherein the third and fifth assemblies 1032,1052 are on a first channel, and simultaneously the sixth and seventh assemblies 1062,1072 are on a second, different channel. In accordance with the disclosed concept, the repeated signal of the master transceiver 1022 is configured to allow the user of the fourth transceiver assembly 1042 to communicate on either of the first or second channels. This is distinct from known repeater technology in which a different repeater is typically needed for each different channel (e.g., the disclosed concept can function with one single repeater to broadcast the signal of a plurality of different channels, which may be logical channels). Furthermore, the repeated signal of the repeater transceiver 1012 is configured to be repeated automatically without actuating an actuator (e.g., a button) of any of the transceiver assemblies 1012, 1022, 1032, 1042, 1052, 1062,1072.

In another example, and continuing to refer to FIG. 15, the stream of data emitted by the fifth transceiver assembly 1052 may have a predetermined bit or bits inserted into a predetermined bit space or bit spaces thereof (e.g., a different bit or bit spaces than the bit or bit spaces of the other repeater transceiver 1012 which cause it to function as a repeater) in order to cause a signal including the stream of data of the fifth full duplex transceiver assembly 1052 to be repeated, and wherein, responsive to the signal from the second full duplex transceiver assembly (e.g., master transceiver 1022) being below a predetermined strength threshold, a signal including the stream of data of the fifth full duplex transceiver assembly 1052 is repeated, thereby allowing the user of the third full duplex transceiver assembly 1032 to communicate with the user of the fourth full duplex transceiver assembly 1042 among the plurality of different channels, even when the third and fourth full duplex transceiver assemblies 1032,1042 are physically out of range to communicate directly with one another.

Additionally, in one example the transceiver assemblies 1022, 1032, 1042, 1052,1062,102 may each have a unique identification number for grouping together embedded within each corresponding stream of data, while the repeater transceiver 1012 may be devoid of such a unique identification number.

In another example, and referring again to FIGS. 4 and 5, the stream of data of a number of the depicted full duplex transceiver assemblies (e.g., full duplex transceiver assemblies 102,212,262,272,282,292 are configured to have an identical predetermined bit or bits inserted into an identical predetermined bit space or bit spaces thereof, thereby allowing each user of these full duplex transceiver assemblies 102,212,262,272,282,292 to, responsive to actuation of the corresponding mechanism, cause each of these plurality of full duplex transceiver assemblies 102,212,262,272,282,292 to automatically enter a full duplex conference mode, regardless of which channel each user was on before the actuation of the corresponding mechanism. Furthermore, in one example, the corresponding headsets 104, 214, 264,

274, 284, 294 are configured to emit low audio tones to let users know they are still in the full duplex conference mode.

That is, if a user of the first full duplex transceiver assembly 102 presses an associated mechanism (e.g., a button) to cause the full duplex conference mode to be entered, the microprocessor of the first full duplex transceiver assembly 102 is configured to cause a low audio tone to be emitted through the first headset 104, in order to remind a user of the first full duplex transceiver assembly 102 that the full duplex conference mode has not been exited. Furthermore, the mechanism of the first full duplex transceiver assembly 102, which may be a push to talk button (e.g., button 134 in FIG. 3), may cause the full duplex conference mode to automatically be entered when pressed a first time, regardless of which channel each user (e.g., users of the transceiver assemblies 102,212,262,272,282, 292) was on before the mechanism (e.g., the button 134) was actuated (e.g., pressed). Additionally, responsive to actuation of the mechanism (e.g., button 134) of the first full duplex transceiver assembly 102 a second, later time, causes each of the plurality of full duplex transceiver assemblies 102, 212, 262, 272, 282, 292 to automatically exit the full duplex conference mode.

It will also be appreciated that, in the instant embodiment, not all transceiver assemblies may be configured to enter the full duplex conference mode. For example, the transceiver assemblies 252,312 (and others) may not be configured to enter the full duplex conference mode, responsive to actuating of a mechanism of one of the aforementioned transceiver assemblies 102, 212, 262, 272, 282, 292. That is, the transceiver assemblies 102, 212, 262, 272, 282, 292 would be configured to enter the full duplex conference mode without the transceiver assemblies 252, 312.

Additionally, in one example, responsive to actuation of the mechanism (e.g., button 134) of a first full duplex transceiver assembly 102 a first time causes a first bit and a second bit to be inserted into a first and second bit space, respectively, of the stream of data of the first full duplex transceiver assembly 102, and simultaneously a third bit to be inserted into a third bit space of each of the other of the plurality of full duplex transceiver assemblies 212,262,272, 282,292. In this example, the second and third bits are identical, the second and third bit spaces are identical, the stream of data of each of the other of the plurality of full duplex transceiver assemblies 212,262,272,282,292 has a fourth bit in a fourth bit space, the first bit is different than the fourth bit, and the first bit space is the same as the fourth bit space. Moreover, responsive to actuation of the mechanism (e.g., button 134) of the first full duplex transceiver assembly 102 a second time later than the first time causes at least two of the first and second bit spaces of the first full duplex transceiver assembly 102 and the third and fourth bit spaces of each of the other of the plurality of full duplex transceiver assemblies 212,262,272,282,292 to automatically change in order to correspondingly be the same.

In another example, and continuing to refer to FIG. 4, the stream of data of a plurality of the full duplex transceiver assemblies (e.g., transceiver assemblies 102,212,262,272, 282,292) has an identical predetermined bit or bits inserted into an identical predetermined bit space or bit spaces thereof, thereby allowing one-directional audio to be passed in a first direction between a first full duplex transceiver assembly 102 of the plurality of full duplex transceiver assemblies 102,212,262,272,282,292, and each of the other of the plurality of full duplex transceiver assemblies 212, 262,272,282,292 responsive to actuation of the mechanism (e.g., button 134) of the first full duplex transceiver assembly 102. The one-directional audio may be either from the other transceiver assemblies 212,262,272,282,292 into the first full duplex transceiver assembly 102, or from the first full duplex transceiver assembly 102 into the other transceiver assemblies 212,262,272,282,292.

In one example, where the first direction is from each of the other of the plurality of full duplex transceiver assemblies 212,262,272,282,292 to the first full duplex transceiver assembly 102, when a user of the first full duplex transceiver assembly 102 is communicating on a first channel of the plurality of different channels (e.g., logical channels), the user of the first full duplex transceiver assembly 102 can hear the audio from each of the other of the plurality of full duplex transceiver assemblies 212,262,272,282,292 in addition to audio from users of the full duplex transceiver assemblies 222,232,242,252 communicating on the first channel. This may present as users on different channels (e.g., special teams coaches, offensive lines coaches, and defense) wanting to hear what is going on another channel, while still listening to their own channel simultaneously.

Additionally, in the same example, the first full duplex transceiver assembly 102 may further include a button (e.g., the volume adjustment button 132 (FIG. 3) or a value adjustment button responsive to the user pressing a menu button and then selecting "LISTEN-ONLY", for example) electrically connected to the microprocessor 152 of the first full duplex transceiver assembly 102, and when the user of the first full duplex transceiver assembly 102 is communicating on the first channel and responsive to actuation of the mechanism (e.g., button 134) of the first full duplex transceiver assembly 102, the audio from the users of full duplex transceiver assemblies 222,232,242,252 communicating on the first channel is passed at a first amplification level, and simultaneously the audio from each of the other of the plurality of full duplex transceiver assemblies 262,272,282, 292 is passed at second amplification level adjustable with respect to the first amplification level responsive to actuation of the volume adjustment button 132.

Moreover, in the same example, it will be appreciated that actuation of the button 134 at a first time is configured to pass the one-directional audio in the first direction, and subsequent actuation of the button 134 at a second, later time is configured to cause the one-directional audio in the first direction to cease.

Additionally, in the same example, embedded with the stream of data of each of the plurality of full duplex transceiver assemblies 102,212,262,272,282,292 is a unique identification number for grouping the plurality of full duplex transceiver assemblies 102,212,262,272,282,292 together, and in this example, the full duplex transceiver assembly 312 may be a floating full duplex transceiver assembly 312 devoid of a unique identification number for grouping with the plurality of full duplex transceiver assemblies 102, 212, 262, 272, 282, 292. In this manner, responsive to actuation of the mechanism of the first full duplex transceiver assembly, one-directional audio is passed in the first direction from the floating full duplex transceiver assembly 312 to the first full duplex transceiver assembly 102, and the floating full duplex transceiver assembly 312 has a mechanism (e.g., a button) configured such that actuation thereof does not cause one-directional audio to be passed between the floating full duplex transceiver assembly 312 and the plurality of full duplex transceiver assemblies 102,212,262,272,282,292. Stated differently, the floating full duplex transceiver assembly 312 can be caused, e.g., via its bit or bits in predetermined bit or bit spaces, to pass audio to the other transceiver assemblies 102,212,262,272,282, 292 in the first direction like the other transceiver assemblies 102,212,262,272,282,292, but because it does not contain a unique identification number, cannot cause, or initiate, one-directional transfer of audio like the other transceiver assemblies 102,212,262,272,282,292.

In a different example, the first direction of one-directional audio passing is from the first full duplex transceiver assembly 102, which may be a director transceiver assembly 102, to each of the other of the plurality of full duplex transceiver assemblies 262,272,282,292. This may present as a director on a movie set wishing to pass one-directional audio into, for example and without limitation, users of a sound team on one channel, users of a lighting team on a different channel, as well as users of a maintenance team on a third channel, wherein the different teams are all on different channels and are all configured to receive director audio on their channels while simultaneously hearing audio on their respective channel (e.g., all users hear audio from the director as well as audio from their own channel, in this embodiment). In such technology, it will be appreciated that when the users of each of the other of the plurality of full duplex transceiver assemblies 262, 272, 282, 292 are communicating on their channels, and the one-directional audio is being passed in the first direction, additional audio is not passed from the other of the plurality of full duplex transceiver assemblies 262,272,282,292 to the first full duplex transceiver assembly 102.

More specifically, when users of each of the full duplex transceiver assemblies 262,272,282,292 are communicating on the plurality of different channels, the users of each of the full duplex transceiver assemblies 262,272,282,292 can hear the audio from a user of the first full duplex transceiver assembly 102 in addition to audio from users of the other of the plurality of full duplex transceiver assemblies 262, 272, 282, 292 communicating on a corresponding one of the plurality of different channels.

Stated differently, when a first group 262,272 of the plurality of full duplex transceiver assemblies are on a first channel of the plurality of different channels, and responsive to actuation of the mechanism (e.g., button 134) of the first full duplex transceiver assembly 102, the audio from users of the first group 262,272 communicating on the first channel is passed among the first group at a first amplification level, and simultaneously the audio from the user of the first full duplex transceiver assembly 102 is passed among the first group at second amplification level adjustable with respect to the first amplification level. Moreover, when the first group 262,272 is on the first channel, a second group 282,292 of the plurality of full duplex transceiver assemblies is configured to communicate on a second, different channel of the plurality of different channels, such that users of the second group 282,292 are configured to hear the audio of the user of the first full duplex transceiver assembly 102 as well as audio of the users of the second group 282,292, without hearing audio from the first group 262,272.

In the same example, responsive to actuation of the mechanism of the first full duplex transceiver assembly 102 to cause the one-directional audio to be passed in the first direction, the microprocessor 152 (FIG. 5) of the first full duplex transceiver assembly 102 is configured to cause a low audio tone to be emitted through the headset 104 connected to the first full duplex transceiver assembly 102, in order to remind a user of the first full duplex transceiver assembly 102 that the one-directional audio is still being passed.

Figure 16:
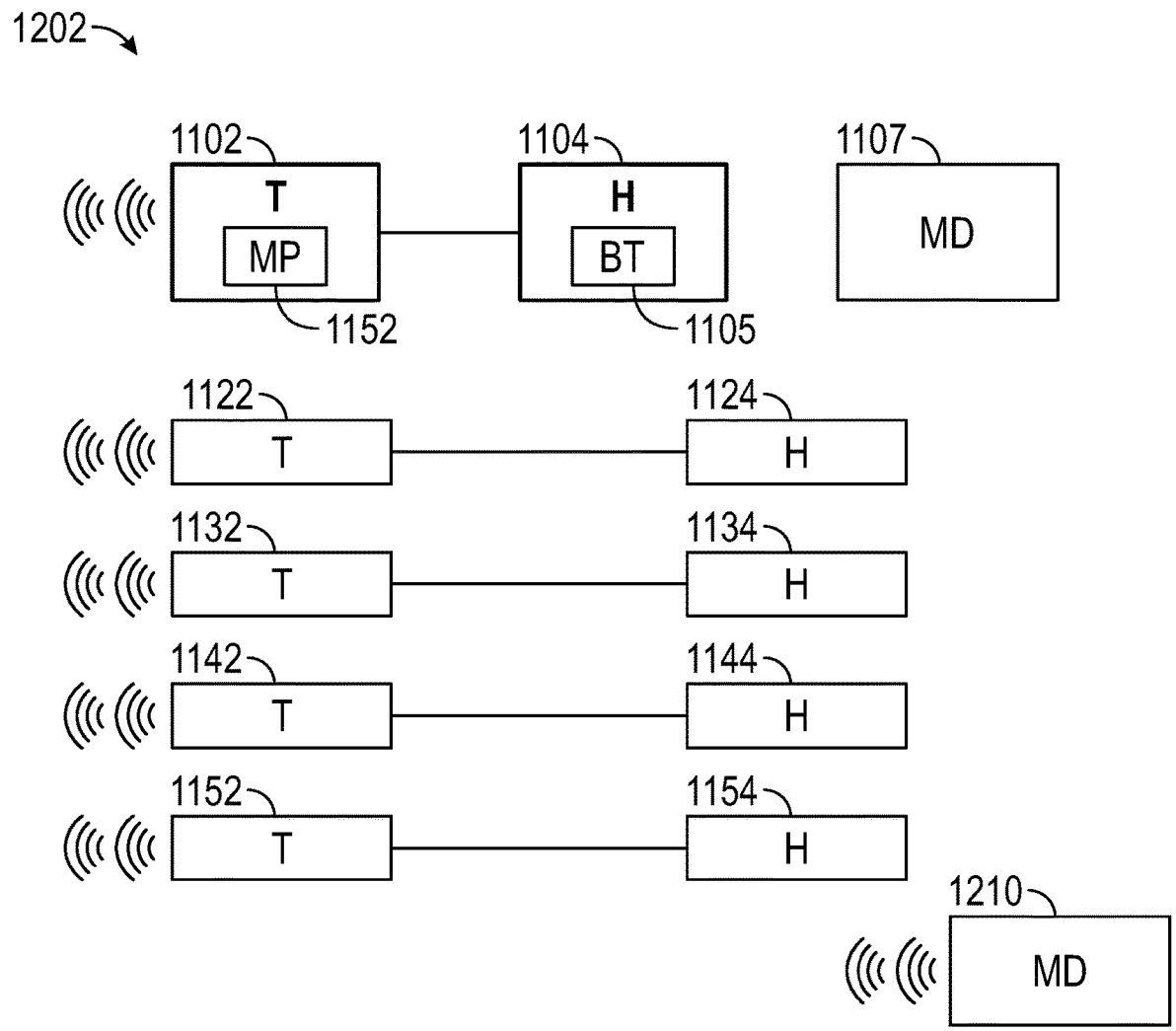
FIG. 16 shows a simplified view of another communication system, wherein a Blue Tooth device is provided with one of the headsets, in accordance with another non-limiting embodiment of the disclosed concept; and Corresponding reference characters indicate corresponding parts throughout the several views. The exemplifications set out herein illustrate exemplary aspects of the disclosure, and such exemplifications are not to be construed as limiting the scope of the disclosure in any manner.

In yet a further example embodiment of the disclosed concept, as shown in FIG. 16, a communication system 1202 includes a plurality of full duplex transceiver assemblies 1102,1122,1132,1142,1152 each having a microprocessor configured to emit a stream of data (e.g., in the same manner as the assemblies 102,212, etc. of FIG. 4), thereby allowing the plurality of full duplex transceiver assemblies 1102, 1122,1132,1142,1152 to communicate among a plurality of different channels (e.g., logical channels). In one example, system 1202 further includes a plurality of headsets 1104, 1124,1134,1144,1154 each electrically connected to a corresponding one of the plurality of full duplex transceiver assemblies 1102, 1122, 1132, 1142, 1152. As shown in FIG. 16, the first headset 1104 may include a Bluetooth Device 1105 electrically connected to the microprocessor 1152 of the first full duplex transceiver assembly 1102. In this manner, responsive to the first headset 1104 receiving a phone call from an external device (e.g., mobile device 1210), the first full duplex transceiver assembly 1102 is configured to cause the phone call to be conferenced among the plurality of different channels (e.g., logical channels) with the first full duplex transceiver assembly and the other full duplex transceiver assemblies 1122,1132,1142,1152.

Put another way, when a distant person calls a mobile device (e.g., cell phone 1107, which may be located in a pocket of the user of the first full duplex transceiver assembly 1102) of a user of the first duplex transceiver assembly 1102 via his or her mobile device (e.g., cell phone 1210), the user of the first full duplex transceiver assembly 1102 can conference the distant person using the cell phone 1210 into communication with the other full duplex transceiver assemblies 1122,1132,1142,1152 via actuating a mechanism (e.g., pressing a button 134). This is achievable via the Bluetooth Device 1105 integrated into the first headset 1104, and providing for an electrical connection between the Bluetooth Device 1105 and the microprocessor 1152. Known systems, by way of contrast, do not provide for mechanisms for Bluetooth callers to be conferenced amongst a plurality of separate transceivers.

Accordingly, in this example it will be appreciated that the user of the cell phone 1210 can communicate (e.g., remotely at relatively large distances) among a plurality of different channels (e.g., logical channels) with the other full duplex transceiver assemblies 1122,1132,1142,1152. For example, the plurality of full duplex transceiver assemblies 1102, 1122,1132,1142,1152 may include a first group 1122,1132 and a second group 1142,1152 of full duplex transceiver assemblies, and when the first full duplex transceiver assembly 1102 and the first group 1122,1132 are on a first channel of the plurality of different channels, the phone call is conferenced on the first channel. It follows that when the first full duplex transceiver assembly 1102 and the second group 1142,1152 are on a second channel of the plurality of different channels, the phone call is conferenced on the second channel. Thus, responsive to a user of the first full duplex transceiver assembly 1102 actuating a mechanism (e.g., button 130, FIG. 3) of the first full duplex transceiver assembly 1102, the first full duplex transceiver assembly 1102 moves from the first channel to the second channel, thereby allowing the phone call (e.g., and thus the user of the cell phone 1210) to be conferenced with the second group 1142,1152 instead of the first group 1122,1132. Furthermore, it will be appreciated that in a system devoid of communication via streams of controlling data (e.g., logical channel communication), blue tooth conferencing is not possible.

While this disclosure has been described as having exemplary methods, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A communication system comprising:
a number of full duplex transceiver assemblies comprising a first full duplex transceiver assembly and a plurality of full duplex transceiver assemblies, the plurality of full duplex transceiver assemblies each having a microprocessor configured to emit a stream of data, thereby allowing the plurality of full duplex transceiver assemblies to communicate among a plurality of different channels, the plurality of full duplex transceiver assemblies comprising a second full duplex transceiver assembly, a third full duplex transceiver assembly, and a fourth full duplex transceiver assembly,
wherein the first full duplex transceiver assembly is configured to emit a stream of data having a predetermined bit or bits inserted into a predetermined bit space or bit spaces thereof in order to cause a signal including the stream of data of the second full duplex transceiver assembly to be repeated, thereby allowing a user of the third full duplex transceiver assembly to communicate with a user of the fourth full duplex transceiver assembly among the plurality of different channels, even when the third and fourth full duplex transceiver assemblies are physically out of range to communicate directly with one another.

2. The communication system according to claim 1, wherein the number of full duplex transceiver assemblies are configured to have a plurality of sequences, wherein the plurality of full duplex transceiver assemblies further comprises a fifth full duplex transceiver assembly, a sixth full duplex transceiver assembly, and a seventh full duplex transceiver assembly, wherein in a first sequence, the third and fifth full duplex transceiver assemblies are on a first channel, thereby allowing a user of the third full duplex transceiver assembly to communicate with a user of the fifth full duplex on the first channel in full duplex, and simultaneously the sixth and seventh full duplex transceiver assemblies are on a second, different channel, thereby allowing users of the sixth and seventh full duplex transceiver assemblies to communicate on the second channel in full duplex, and wherein the repeated signal of the second full duplex transceiver assembly is configured to allow the user of the fourth full duplex transceiver assembly to communicate on both the first channel and the second channel.

3. The communication system according to claim 1, further comprising a fifth full duplex transceiver assembly, wherein the stream of data emitted by the fifth full duplex transceiver assembly has a predetermined bit or bits inserted into a predetermined bit space or bit spaces thereof in order to cause a signal including the stream of data of the fifth full duplex transceiver assembly to be repeated, and wherein, responsive to the signal from the second full duplex transceiver assembly being below a predetermined strength threshold, a signal including the stream of data of the fifth full duplex transceiver assembly is repeated, thereby allowing the user of the third full duplex transceiver assembly to communicate with the user of the fourth full duplex transceiver assembly among the plurality of different channels, even when the third and fourth full duplex transceiver assemblies are physically out of range to communicate directly with one another.

4. The communication system according to claim 3, wherein the plurality of channels are a plurality of logical channels.

5. The communication system according to claim 1, wherein the signal from the second full duplex transceiver assembly is configured to be repeated automatically without actuating an actuator of any of the plurality of full duplex transceiver assemblies.

6. The communication system according to claim 1, wherein, embedded with the stream of data of the third and fourth full duplex transceiver assemblies is a unique identification number for grouping the third and fourth full duplex transceiver assemblies together, and wherein the first full duplex transceiver is devoid of a unique identification number for grouping the first full duplex transceiver assembly with the third and fourth full duplex transceiver assemblies.

7. The communication system according to claim 1, wherein the stream of data emitted by the second full duplex transceiver assembly has a predetermined bit or bits inserted into a first predetermined bit space or bit spaces thereof in order to cause the second full duplex transceiver assembly to function as a master transceiver assembly, and wherein each of the other of the plurality of full duplex transceiver assemblies has a different predetermined bit or bits inserted into a corresponding first predetermined bit space or bit spaces thereof in order to cause each of the other of the plurality of full duplex transceiver assemblies to function as a slave transceiver assembly.

8. The communication system according to claim 7, wherein the predetermined bit space or bit spaces corresponding to the predetermined bit or bits of the first full duplex transceiver assembly are a second predetermined bit space or bit spaces in order to cause the first full duplex transceiver assembly to function as a repeater transceiver, and wherein each of the other of the plurality of full duplex transceiver assemblies has a different predetermined bit or bits inserted into a corresponding second predetermined bit space or bit spaces thereof.

9. A communication system comprising:
a number of full duplex transceiver assemblies comprising a plurality of full duplex transceiver assemblies each having a mechanism and a microprocessor electrically connected to the mechanism, the microprocessor of each of the plurality of full duplex transceiver assemblies configured to emit a stream of data,
wherein the stream of data of each of the plurality of full duplex transceiver assemblies are configured to have an identical predetermined bit or bits inserted into an identical predetermined bit space or bit spaces thereof, thereby allowing each user of the plurality of full duplex transceiver assemblies to, responsive to actuation of the corresponding mechanism, cause each of the plurality of full duplex transceiver assemblies to automatically enter a full duplex conference mode, regardless of which channel said each user was on before the actuation of the corresponding mechanism.

10. The communication system according to claim 9, wherein the plurality of full duplex transceiver assemblies comprises a first full duplex transceiver assembly, wherein the communication system further comprises a plurality of headsets each electrically connected to a corresponding one of the plurality of full duplex transceiver assemblies, wherein the plurality of headsets comprises a first headset for the first full duplex transceiver assembly, and wherein, responsive to actuation of the mechanism of the first full duplex transceiver assembly to cause the full duplex conference mode to be entered, the microprocessor of the first full duplex transceiver assembly is configured to cause a low audio tone to be emitted through the first headset, in order to remind a user of the first full duplex transceiver assembly that the full duplex conference mode has not been exited.

11. The communication system according to claim 9, wherein the plurality of full duplex transceiver assemblies comprises a first full duplex transceiver assembly, wherein, responsive to actuation of the mechanism of the first full duplex transceiver assembly a first time causes each of the plurality of full duplex transceiver assemblies to automatically enter the full duplex conference mode, regardless of which channel said each user was on before the actuation of the corresponding mechanism, and wherein, responsive to actuation of the mechanism of the first full duplex transceiver assembly a second, later time, causes each of the plurality of full duplex transceiver assemblies to automatically exit the full duplex conference mode.

12. The communication system according to claim 11, wherein the mechanism is a button.

13. The communication system according to claim 9, wherein the number of full duplex transceiver assemblies further comprises an additional full duplex transceiver assembly having a microprocessor configured to emit a stream of data in order to allow the additional full duplex transceiver assembly and the plurality of full duplex transceiver assemblies to communicate among a plurality of channels, and wherein, responsive to actuation of the corresponding mechanism, each of the plurality of full duplex transceiver assemblies automatically enters the full duplex conference mode without the additional full duplex transceiver assembly.

14. The communication system according to claim 9, wherein, responsive to actuation of the mechanism of a first full duplex transceiver assembly of the plurality of full duplex transceiver assemblies a first time causes a first bit and a second bit to be inserted into a first and second bit space, respectively, of the stream of data of the first full duplex transceiver assembly, and simultaneously a third bit to be inserted into a third bit space of each of the other of the plurality of full duplex transceiver assemblies, wherein the second and third bits are identical, wherein the second and third bit spaces are identical, wherein the stream of data of each of the other of the plurality of full duplex transceiver assemblies has a fourth bit in a fourth bit space, wherein the first bit is different than the fourth bit, and wherein the first bit space is the same as the fourth bit space.

15. The communication system according to claim 14, wherein, responsive to actuation of the mechanism of the first full duplex transceiver assembly a second time later than the first time causes at least two of the first and second bit spaces of the first full duplex transceiver assembly and the third and fourth bit spaces of each of the other of the plurality of full duplex transceiver assemblies to automatically change in order to correspondingly be the same.

16. A communication system comprising:
a number of full duplex transceiver assemblies configured to communicate on a plurality of different channels, the number of full duplex transceiver assemblies comprising a plurality of full duplex transceiver assemblies each having a mechanism and a microprocessor electrically connected to the mechanism, the microprocessor of each of the plurality of full duplex transceiver assemblies configured to emit a stream of data,
wherein the stream of data of each of the plurality of full duplex transceiver assemblies has an identical predetermined bit or bits inserted into an identical predetermined bit space or bit spaces thereof, thereby allowing one-directional audio to be passed in a first direction between a first full duplex transceiver assembly of the plurality of full duplex transceiver assemblies, and each of the other of the plurality of full duplex transceiver assemblies responsive to actuation of the mechanism of the first full duplex transceiver assembly.

17. The communication system according to claim 16, wherein the first direction is from each of the other of the plurality of full duplex transceiver assemblies to the first full duplex transceiver assembly, and wherein, when a user of the first full duplex transceiver assembly is communicating on a first channel of the plurality of different channels, the user of the first full duplex transceiver assembly can hear the audio from each of the other of the plurality of full duplex transceiver assemblies in addition to audio from users of the number of full duplex transceiver assemblies communicating on the first channel.

18. The communication system according to claim 17, wherein the first full duplex transceiver assembly further comprises a button electrically connected to the microprocessor of the first full duplex transceiver assembly, wherein, when the user of the first full duplex transceiver assembly is communicating on the first channel and responsive to actuation of the mechanism of the first full duplex transceiver assembly, the audio from the users of the number of full duplex transceiver assemblies communicating on the first channel is passed at a first amplification level, and simultaneously the audio from each of the other of the plurality of full duplex transceiver assemblies is passed at second amplification level adjustable with respect to the first amplification level responsive to actuation of the button.

19. The communication system according to claim 17, wherein the mechanism of the first full duplex transceiver assembly is a button, wherein actuation of the button at a first time is configured to pass the one-directional audio in the first direction, and wherein actuation of the button at a second, later time is configured to cause the one-directional audio in the first direction to cease.

20. The communication system according to claim 16, wherein, embedded with the stream of data of each of the plurality of full duplex transceiver assemblies is a unique identification number for grouping the plurality of full duplex transceiver assemblies together, wherein the number of full duplex transceiver assemblies further comprises a floating full duplex transceiver assembly devoid of a unique identification number for grouping with the plurality of full duplex transceiver assemblies, wherein, responsive to actuation of the mechanism of the first full duplex transceiver assembly, one-directional audio is passed in the first direction from the floating full duplex transceiver assembly to the first full duplex transceiver assembly, and wherein the floating full duplex transceiver assembly has a mechanism configured such that actuation thereof does not cause one-directional audio to be passed between the floating full duplex transceiver assembly and the plurality of full duplex transceiver assemblies.

21. The communication system according to claim 16, wherein the first direction is from the first full duplex transceiver assembly to each of the other of the plurality of full duplex transceiver assemblies, and wherein, when users of each of the other of the plurality of full duplex transceiver assemblies are communicating on the plurality of different channels, the users of each of the other of the plurality of full duplex transceiver assemblies can hear the audio from a user of the first full duplex transceiver assembly in addition to audio from users of the other of the plurality of full duplex transceiver assemblies communicating on a corresponding one of the plurality of different channels.

22. The communication system according to claim 21, wherein, when a first group of the plurality of full duplex transceiver assemblies are on a first channel of the plurality of different channels, and responsive to actuation of the mechanism of the first full duplex transceiver assembly, the audio from users of the first group communicating on the first channel is passed among the first group at a first amplification level and simultaneously the audio from the user of the first full duplex transceiver assembly is passed among the first group at second amplification level adjustable with respect to the first amplification level.

23. The communication system according to claim 22, wherein, when the first group is on the first channel, a second group of the plurality of full duplex transceiver assemblies is configured to communicate on a second, different channel of the plurality of different channels, wherein users of the second group are configured to hear the audio of the user of the first full duplex transceiver assembly as well as audio of the users of the second group, without hearing audio from the first group.

24. The communication system according to claim 21, wherein, when the users of each of the other of the plurality of full duplex transceiver assemblies are communicating on the channel, and the one-directional audio is being passed in the first direction, additional audio is not passed from the other of the plurality of full duplex transceiver assemblies to the first full duplex transceiver assembly.

25. The communication system according to claim 16, wherein the communication system further comprises a plurality of headsets each electrically connected to a corresponding one of the plurality of full duplex transceiver assemblies, wherein the plurality of headsets comprises a first headset for the first full duplex transceiver assembly, and wherein, responsive to actuation of the mechanism of the first full duplex transceiver assembly to cause the one-directional audio to be passed in the first direction, the microprocessor of the first full duplex transceiver assembly is configured to cause a low audio tone to be emitted through the first headset, in order to remind a user of the first full duplex transceiver assembly that the one-directional audio is still being passed.

26. A communication system comprising:
a plurality of full duplex transceiver assemblies each having a microprocessor configured to emit a stream of data, thereby allowing the plurality of full duplex transceiver assemblies to communicate among a plurality of different channels, wherein the plurality of full duplex transceiver assemblies comprises a first full duplex transceiver assembly; and
a plurality of headsets each electrically connected to a corresponding one of the plurality of full duplex transceiver assemblies, wherein the plurality of headsets comprises a first headset electrically connected to the first full duplex transceiver assembly,
wherein, responsive to the first headset receiving a phone call from an external device, the first full duplex transceiver assembly is configured to cause the phone call to be conferenced among the plurality of different channels with the first full duplex transceiver assembly.

27. The communication system according to claim 26, wherein the first headset comprises a Bluetooth device electrically connected to the microprocessor of the first full duplex transceiver assembly.

28. The communication system according to claim 26, wherein the plurality of full duplex transceiver assemblies further comprises a first group and a second group of full duplex transceiver assemblies, wherein, when the first full duplex transceiver assembly and the first group are on a first channel of the plurality of different channels, the phone call is conferenced on the first channel, wherein, when the first full duplex transceiver assembly and the second group are on a second channel of the plurality of different channels, the phone call is conferenced on the second channel, and wherein, responsive to a user of the first full duplex transceiver assembly actuating a mechanism of the first full duplex transceiver assembly, the first full duplex transceiver assembly moves from the first channel to the second channel, thereby allowing the phone call to be conferenced with the second group instead of the first group.

\* \* \* \* \*